(12) United States Patent
Sugasaki

(10) Patent No.: US 8,361,702 B2
(45) Date of Patent: *Jan. 29, 2013

(54) RESIN COMPOSITION FOR LASER ENGRAVING, RESIN PRINTING PLATE PRECURSOR FOR LASER ENGRAVING, RELIEF PRINTING PLATE AND METHOD FOR PRODUCTION OF RELIEF PRINTING PLATE

(75) Inventor: Atsushi Sugasaki, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 344 days.

This patent is subject to a terminal disclaimer.

(21) Appl. No.: 12/267,137

(22) Filed: Nov. 7, 2008

(65) Prior Publication Data

US 2009/0123712 A1    May 14, 2009

(30) Foreign Application Priority Data

Nov. 8, 2007   (JP) ................................. 2007-291020

(51) Int. Cl.
*B41N 7/00*    (2006.01)
*G03F 7/00*    (2006.01)

(52) U.S. Cl. .................. 430/306; 430/281.1; 430/270.1; 430/300

(58) Field of Classification Search ..................... 528/44; 525/127; 430/270.1, 302, 434
See application file for complete search history.

(56) References Cited

U.S. PATENT DOCUMENTS

| 3,960,572 | A | * | 6/1976 | Ibata et al. ................. 430/283.1 |
| 5,300,350 | A | | 4/1994 | Grosser et al. |
| 5,607,814 | A | | 3/1997 | Fan et al. |
| 5,798,202 | A | | 8/1998 | Cushner et al. |
| 6,020,108 | A | | 2/2000 | Goffing et al. |
| 6,159,659 | A | | 12/2000 | Gelbart |
| 6,214,521 | B1 | | 4/2001 | Telser et al. |
| 6,946,182 | B1 | * | 9/2005 | Allgeuer et al. ................. 428/92 |
| 7,709,594 | B2 | * | 5/2010 | Sakamoto et al. ............. 528/279 |
| 2003/0180636 | A1 | | 9/2003 | Kanga et al. |
| 2003/0180655 | A1 | | 9/2003 | Fan et al. |
| 2005/0187104 | A1 | * | 8/2005 | Laney et al. ................... 503/227 |
| 2007/0054998 | A1 | * | 3/2007 | Harashina ...................... 524/189 |
| 2008/0070154 | A1 | * | 3/2008 | Taguchi ...................... 430/270.1 |
| 2008/0156212 | A1 | * | 7/2008 | Yamada et al. ................ 101/375 |
| 2008/0180801 | A1 | * | 7/2008 | Kobayashi et al. ........... 359/586 |
| 2009/0176176 | A1 | * | 7/2009 | Araki et al. ................. 430/286.1 |

FOREIGN PATENT DOCUMENTS

| EP | 0453218 A1 | 10/1991 |
| EP | 1170121 A1 | 1/2002 |
| JP | 9-171247 A | 6/1997 |
| JP | 2773847 B2 | 4/1998 |
| JP | 2846954 B2 | 10/1998 |
| JP | 11-170718 A | 6/1999 |
| JP | 11-338139 A | 12/1999 |
| JP | 2000-168253 A | 6/2000 |
| JP | 2000-318330 A | 11/2000 |
| JP | 2002-357907 A | 12/2002 |
| WO | 94/19408 A1 | 9/1994 |
| WO | WO 94/19408 | * 9/1994 |

OTHER PUBLICATIONS

Extended European Search Report dated Dec. 22, 2010 in EP Application No. 08168588.5.
Partial European Search Report dated Jun. 24, 2010, issued in counterpart European Application No. 08168588.5-2304, (6 pages).
Chinese Office Action issued on Oct. 31, 2011 in corresponding Chinese Application No. 200810174878.1.

* cited by examiner

*Primary Examiner* — Cynthia Kelly
*Assistant Examiner* — Chanceity Robinson
(74) *Attorney, Agent, or Firm* — Sughrue Mion, PLLC

(57) ABSTRACT

A resin composition for laser engraving comprising a binder polymer contains at least one polyester (A) selected from the group consisting of a polyester containing a hydroxycarboxylic acid unit, polycaprolactone, poly(butylene succinic acid), and derivatives thereof.

4 Claims, No Drawings

RESIN COMPOSITION FOR LASER ENGRAVING, RESIN PRINTING PLATE PRECURSOR FOR LASER ENGRAVING, RELIEF PRINTING PLATE AND METHOD FOR PRODUCTION OF RELIEF PRINTING PLATE

FIELD OF THE INVENTION

The present invention relates to a resin composition for laser engraving, a resin printing plate precursor for laser engraving, a relief printing plate and a method for production of a relief printing plate.

BACKGROUND OF THE INVENTION

As a method of preparation of a relief printing plate by forming a concavity and convexity on the surface, a so-called "analog plate making", that is, a method in which a photosensitive elastomer composition or photosensitive resin composition is exposed to ultraviolet light through an original film to selectively cure the image area and the uncured area is removed with a developer is well known.

The photosensitive elastomer composition contains an elastomeric polymer, for example, a synthetic rubber, as a carrier and since the relief image formed therefrom is flexible, the printing plate is referred to as a flexographic printing plate.

The flexographic printing plate has an aptitude for water-based ink, alcohol ink and ester ink each using ink vehicle which does not corrode the rubber and non-solvent UV ink. Since the flexographic printing plate is flexible, it has a printing aptitude for a printing material having a large concavity and convexity on the surface or a packaging material having a low strength. However, since it is apt to be deformed by the application of stress, a printing pressure is necessary to be low. On the other hand, the photosensitive resin composition uses a plastic resin (plastic) as the carrier. The relief printing plate obtained is hard and is referred to as a resin anastatic printing plate (letter press) which is distinguished from the flexographic printing plate. Commercially available resin anastatic printing plates include a water development type and an alcohol development type and contain a water-soluble resin and an alcohol-soluble resin, respectively. Ink mainly used therefor is oil-based ink using ink vehicle which does not corrode the resin and non-solvent UV ink. Since the resin anastatic printing plate is hard, a high printing pressure can be applied and clear and sharp printing can be performed by supplying a large amount of ink.

Since the analog plate making requires an original film using a silver salt material in many cases, the time and cost for producing the original film are necessary. Further, in order to develop the original film, a chemical treatment is required and treatment of the waste liquid of development is also needed, the analog plate making is disadvantageous in view of environmental health.

As a means for solving the problems according to the analog plate making, a flexographic printing plate precursor and the resin anastatic printing plate precursor having a laser-sensitive mask layer element capable of forming an image mask on site (in situ) provided on the photosensitive elastomer layer and the photosensitive resin layer, respectively, are proposed (see, for example, Japanese Patent 2773847 (corresponding to U.S. Pat. No. 5,607,814) and JP-A-9-171247 (the term "JP-A" as used herein means an "unexamined published Japanese patent application") (corresponding to U.S. Pat. No. 6,020,108)). According to a plate making method of the printing plate precursor, the printing plate precursor is subjected to laser irradiation based on image data controlled by digital devices to form an image mask from the mask layer element on site, then similar to the analog plate making, the printing plate precursor is exposed to ultraviolet light through the image mask and either the photosensitive elastomer layer or the photosensitive resin layer and the image mask are removed by development. The plate making method is referred to as a "mask CTP system" in the field of flexographic printing plate or resin anastatic printing plate. Although the mask CTP system resolves the problems relating to the process of producing the original film described above, the problems on the treatment of waste liquid resulting from the development of the photosensitive elastomer layer or the photosensitive resin layer still remain. Further, in case of the flexographic printing plate, since a chlorine solvent, for example, trichloroethylene is used in the development in many instances, the system is also disadvantageous in view of working health.

As a means for solving the problems of the development process and development waste liquid, a so-called "heat development system", that is, a method in which the photosensitive elastomer layer is heated and the uncured portion is removed by softening is proposed (see, for example, JP-A-2002-357907 (corresponding to US 2003/0180655 A1)). Since the system does not use a developer, it is favorable in view of working environment and the development waste can be subjected to incineration disposal without a particular segregation process. However, since the developing speed of the heat development system is extremely low in comparison with that of the solvent development system, other problems in that the working efficiency is poor and in that a complicated and costly development apparatus is required.

As another means for solving the problems of the development process and development waste liquid, a so-called "direct engraving CTP system", that is, a direct engraving plate making method with laser is often proposed. The direct engraving CTP system is literally a method of making a concavity and convexity to form a relief by engraving with laser and is advantageous in that unlike the formation of relief using an original film, the formation of relief can be freely controlled. For instance, it is possible that a position where an outline character is reproduced on a printed material is deeply engraved and that in a part where minute halftone dots are reproduced, the halftone dots are engraved to form shoulders in order to prevent collapse of the halftone dots due to the printing pressure.

In Japanese Patent 2846954 (corresponding to U.S. Pat. No. 5,798,202), JP-A-11-338139 and JP-A-11-170718, a laser-engravable flexographic printing plate precursor and a flexographic printing plate obtained by laser engraving are described. In these patent documents, a monomer is mixed with an elastomeric rubber as a binder and the mixture is cured by a heat polymerization mechanism or photopolymerization mechanism and then is subjected to laser engraving to obtain a flexographic printing plate.

As a problem of the direct engraving CTP system, it is illustrated that the seed of laser engraving is low. This is because in the direct engraving CTP system, at least a thickness of 100 µm is necessary to engrave in view of the feature of directly forming the relief, in contrast with the mask CTP system wherein a thickness of the mask layer element which is an object to be ablated is approximately from 1 to 10 µm. Thus, some proposals intended to improve the laser engraving sensitivity have been made.

For instance, a flexographic printing plate precursor for laser engraving containing an elastomer foam is proposed (JP-A-2000-318330 (corresponding to U.S. Pat. No. 6,159, 659)). Although the improvement in laser engraving sensitivity is intended by using the foam having low density, a problem arises in that because of using the material of low density, the strength for a printing plate is insufficient and printing durability is severely impaired.

Also, a flexographic printing plate precursor for laser engraving including microspheres containing hydrocarbon gas encapsulated is proposed (US 2003/0180636 A1). The improvement in laser engraving sensitivity is intended by the system in which the gas in the microspheres expands with heat generated by laser to destroy the graving material. However, a problem arises in that the strength for a printing plate is apt to be insufficient because of the material system including the gas. Further, since the gas has a property of easy expansion with heat in comparison with a solid, even when microspheres having a high heat deformation initiation temperature are used, change in the volume due to fluctuation of the outer temperature can not be avoided and thus it is not suitable to use as a printing plate which is required stability of the accuracy of thickness.

Further, a flexographic printing plate precursor for laser engraving containing a polymer filler having a ceiling temperature of less than 600K is proposed (JP-A-2000-168253 (corresponding to U.S. Pat. No. 6,214,521)). Although the improvement in laser engraving sensitivity is intended by adding the polymer filler having a low depolymerization temperature, the use of such a polymer filler makes a concavity and convexity on the surface of printing plate precursor which seriously influences printing quality.

SUMMARY OF THE INVENTION

An object of the present invention is to provide a resin composition which can be used in a printing plate precursor having high engraving sensitivity with laser and being capable of undergoing direct plate making with laser engraving. Another object of the invention is to provide a resin printing plate precursor for laser engraving having a high engraving sensitivity.

(1) A resin composition for laser engraving comprising a binder polymer containing at least one polyester (A) selected from the group consisting of a polyester comprising a hydroxycarboxylic acid unit, polycaprolactone (PCL), poly(butylene succinic acid), and derivatives thereof.
(2) The resin composition for laser engraving as described in (1) above, wherein the polyester (A) is selected from the group consisting of a polyhydroxyalkanoate (PHA), a lactic acid polymer, polyglycolic acid (PGA), polycaprolactone (PCL), poly(butylene succinic acid), and derivatives thereof, and mixtures thereof.
(3) The resin composition for laser engraving as described in (1) or (2) above, wherein the polyester (A) is selected from the group consisting of a polyhydroxyalkanoate (PHA), a lactic acid polymer, polyglycolic acid (PGA), and derivatives thereof, and mixtures thereof.
(4) The resin composition for laser engraving as described in any one of (1) to (3) above, wherein the binder polymer further contains a hydrophilic polymer.
(5) The resin composition for laser engraving as described in (4) above, wherein the hydrophilic polymer is a polyvinyl alcohol (PVA) derivative.
(6) The resin composition for laser engraving as described in any one of (1) to (5) above, which comprises (C) a polymerizable compound.
(7) The resin composition for laser engraving as described in any one of (1) to (6) above, which comprises (D) a light-to-heat conversion agent capable of absorbing light having a wavelength of 700 to 1,300 nm.
(8) The resin composition for laser engraving as described in (7) above, wherein the light-to-heat conversion agent (D) is selected from the group consisting of carbon black, a cyanine compound and a phthalocyanine compound.
(9) A resin printing plate precursor for laser engraving having a relief-forming layer comprising the resin composition for laser engraving as described in any one of (1) to (8) above.
(10) A method for production of a relief printing plate comprising (1) a process of crosslinking the relief-forming layer as described in (9) above with light and/or heat and (2) a process of laser engraving the crosslinked relief-forming layer.
(11) The method for production of a relief printing plate as described in (10) above, wherein the process (1) is a process of crosslinking the relief-forming layer with heat.
(12) A relief printing plate produced by the method for production of a relief printing plate as described in (10) or (11) above.
(13) The relief printing plate as described in (12) above, wherein a thickness of the relief-forming layer crosslinked is 0.05 mm or more.
(14) The relief printing plate as described in (12) or (13) above, wherein a shore A hardness of the relief-forming layer crosslinked is from 50 to 90°.

According to the present invention, a resin composition for laser engraving having a high engraving sensitivity to laser is obtained. Thus, the time necessary for the formation of relief can be shortened. Also, by using the resin composition for laser engraving according to the invention, a printing plate precursor for laser engraving having the high engraving sensitivity can be obtained. The resin composition can also be utilized for a resin anastatic printing plate (letter press) having a convex relief, a flexographic printing plate, a stamp, an intaglio printing plate or a screen printing plate and the application range thereof should not be construed as being limited thereto.

DETAILED DESCRIPTION OF THE INVENTION

Embodiments of the present invention will be described below.

[Resin Composition for Laser Engraving]

The resin composition for laser engraving according to the invention comprises a binder polymer containing at least one polyester (A) selected from the group consisting of a polyester comprising a hydroxycarboxylic acid unit, polycaprolactone (PCL), poly(butylene succinic acid), and derivatives thereof. The term "derivative" as used herein means a copolymer containing 50% by mole or less (preferably 30% by mole or less, more preferably 10% by mole or less) of other copolymerization component.

The elements of the resin composition for laser engraving are described in detail below. The resin composition for laser engraving according to the invention is also referred to as a "resin composition according to the invention", hereinafter.

<(A) Polyester>

The polyester (A) for use in the invention is at least one polyester selected from the group consisting of a polyester comprising a hydroxycarboxylic acid unit and a derivative thereof, polycaprolactone (PCL) and a derivative thereof, and poly(butylene succinic acid) and a derivative thereof. These polyesters can be used individually or in combination as the binder polymer in the resin composition according to the invention.

The term "polyester comprising a hydroxycarboxylic acid unit" as used herein means a polyester obtained by a polymerization reaction using a hydroxycarboxylic acid as one of the raw materials. The term "hydroxycarboxylic acid" as used herein means a compound having at least one OH group and at least one COOH group in its molecule. It is preferred that at least one OH group and at least one COOH group in the hydroxycarboxylic acid are located adjacent to each other and a number of atoms connecting the OH group and the COOH group is preferably 6 or less, more preferably 4 or less.

Specifically, the polyester (A) is preferably selected from a polyhydroxyalkanoate (PHA), a lactic acid polymer, polyglycolic acid (PGA), polycaprolactone (PCL), poly(butylene succinic acid), and derivatives thereof, and mixtures thereof.

The functional mechanism according to the invention is not quite clear but is presumed as follows.

The polyester (A) has a feature in that a part of the main chain thereof is thermally decomposed at a relatively low temperature around 300° C. at the thermal decomposition (that is, laser engraving according to the invention) and from there, the polyester undergoes a depolymerization reaction (a reverse reaction of a polymerization reaction in which a polymer is thermally dissociated to a low molecular monomer unit of a raw material).

It is believed that the laser engraving (particularly, with a near-infrared laser) conducted in the invention is composed of five processes of (1) light absorption by a compound having an absorption maximum wavelength in a range of 700 to 1,300 nm, (2) light-to-heat conversion by the compound having an absorption maximum wavelength in a range of 700 to 1,300 nm, (3) heat transfer from the compound having an absorption maximum wavelength in a range of 700 to 1,300 nm to a binder adjacent thereto, (4) thermal decomposition of the binder, and (5) dissipation of the decomposed binder.

Since the polyester (A) has the low temperature thermal decomposition property and depolymerization property as described above, the process (4) is accelerated by the low temperature thermal decomposition property and a low molecular monomer (largely volatilizes at less than 250° C.) generated by the depolymerization volatilizes immediately to progress extremely effectively the process (5). It is believed that due to these two advantageous effects the laser engraving sensitivity becomes extremely high.

As an example of the polyester (A), a polyester obtained by a polymerization reaction using a hydroxycarboxylic acid as one of the raw materials is described below.

As PHA of the polyester (A), a polymer having a repeating monomer unit represented by formula (a) shown below is preferable.

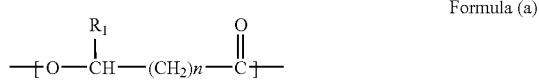

Formula (a)

In formula (a), n represents an integer of 1 to 5, $R_1$ represents a hydrogen atom, an alkyl group or an alkenyl group. The alkyl group and alkenyl group each preferably has from 1 to 20 carbon atoms. The polymer includes a homopolymer wherein the combination of $R_1$ and n in the repeating monomer unit is same and fixed and a copolymer having at least two different repeating monomer units with respect to the combination of $R_1$ and n. The copolymer may be a random, block, alternative or graft polymer. The molecular weight of PHA is ordinarily in a range from 500 to 5,000,000 g/mol, preferably from 1,000 to 2,500,000 g/mol, more preferably from 2,500 to 1,000,000 g/mol.

The PHA for use in the invention includes poly-3-hydroxybutyrate, poly-3-hydroxyvalerate, poly-3-hydroxyheptanoate, poly-3-hydroxyoctanoate, poly-4-hydroxybutyrate, poly(3-hydroxybutyrate-co-3-hydroxyvalerate), poly(3-hydroxybutyrate-co-4-hydroxybutyrate), poly(3-hydroxybutyrate-co-3-hydroxyoctanoate) and other copolymers. The copolymer of PHA contains ordinarily 40% or more and less than 100%, preferably from 60 to 98%, of 3-hydroxybutyrate monomer.

Further, as the polyester (A), a copolymer can also be used wherein as a comonomer copolymerizable with the repeating monomer unit represented by formula (a), a monomer used in a polyester which can be used together with the polyester (A) described hereinafter is used.

The lactic acid polymer for use in the invention includes polylactic acid (in formula (a), $R_1$ represents a methyl group and n represents 0) and a copolymer of lactic acid and a hydroxycarboxylic acid. Examples of the hydroxycarboxylic acid include glycolic acid (in formula (a), $R_1$ represents a hydrogen atom and n represents 0), hydroxybutyric acid, hydroxyvaleric acid, hydroxypentanoic acid, hydroxycaproic acid and hydroxyheptanoic acid. Preferable molecular structure of the polylactic acid is composed of from 85 to 100% of unit of any one of L-lactic acid and D-lactic acid and 0 to 15% of lactic acid unit of the antipode. The copolymer of lactic acid and a hydroxycarboxylic acid is composed of from 85 to less than 100% of unit of any one of L-lactic acid and D-lactic acid and more than 0 to 15% of a hydroxycarboxylic acid unit. From the standpoint of availability of the raw materials, DL-lactic acid (racemic body) may be used as the lactic acid. Preferable examples of the hydroxycarboxylic acid include glycolic acid and hydroxycaproic acid.

The lactic acid polymer can be obtained by selecting as a raw material monomer, a monomer having the desired structure from L-lactic acid, D-lactic acid and a hydroxycarboxylic acid and conducting dehydration polycondensation. Preferably, it can be obtained by selecting a monomer having the desired structure from lactide of a cyclic dimer of lactic acid, glycolide of a cyclic dimer of glycolic acid and a lactone and conducting a ring-opening polymerization. The lactide includes L-lactide of a cyclic dimer of L-lactic acid, D-lactide of a cyclic dimer of D-lactic acid, meso-lactide of a cyclic dimer of D-lactic acid and L-lactic acid and a DL-lactide of a racemic mixture of D-lactide and L-lactide. Any lactide may be used in the invention. However, as the main raw material, D-lactide, L-lactide, glycolide or caprolactone is preferably used.

As to the polylactic acid and copolymer of lactic acid and glycolic acid, a lactic acid/glycolic acid ratio (molar ratio) is preferably from 100/0 to 30/70, more preferably from 100/0 to 40/60, and a weight-average molecular weight is preferably approximately from 1,000 to 100,000, more preferably approximately from 2,000 to 80,000.

Of the polylactic acid and copolymer of lactic acid and glycolic acid, the polylactic acid is preferable than the copolymer of lactic acid and glycolic acid in view of maintaining strong film property.

The polycaprolactone (PCL) (in formula (a), $R_1$ represents a hydrogen atom and n represents 4) used as the polyester (A) may be a homopolymer or a copolymer of caprolactone and other lactone and includes the polyesters having the same structure represented by formula (a) above.

The poly(butylene succinic acid) used as the polyester (A) is not a polyester composed of only a hydroxycarboxylic acid unit but a polymer synthesized from 1,4-butanediol and succinic acid and a hydroxycarboxylic acid may be used together.

As the polyesters described for the polyester (A), copolymers can also be used wherein as a copolymerizable comonomer, a monomer used in a polyester which can be used together with the polyester (A) described hereinafter is used.

Examples of polyester other than the polyester (A) preferably used together with the polyester (A) are described below. However, poly(butylene succinic acid) is used as the polyester (A).

Such other polyesters include a polyester composed of an aliphatic (including cyclic aliphatic) glycol, an aromatic dicarboxylic acid or an acid anhydride thereof, an aliphatic dicarboxylic acid or an acid anhydride thereof (hereinafter also simply referred to as an "aliphatic dicarboxylic acid"), as a monomer, for the purpose, for example, of adjusting water-resistance and flexibility of a film.

If desired, the other polyester may include as the third component, at least one polyfunctional component selected from a tri-functional or tetra-functional polyhydric alcohol and a polyvalent carboxylic acid or an acid hydride thereof.

As the glycol, ethylene glycol, 1,4-butanediol, 1,6-hexanediol, 1,8-octanediol, 1,10-decanediol, 1,4-cyclohexanediol and mixtures thereof are preferably used, but the glycol should not be construed as being limited thereto.

As the aromatic dicarboxylic acid, terephthalic acid, isophthalic acid, phthalic acid, naphthalenedicarboxylic acid and mixtures thereof are preferably used, but the aromatic dicarboxylic acid should not be construed as being limited thereto.

As the aliphatic dicarboxylic acid, succinic acid, adipic acid, suberic acid, sebacic asid, 1,10-decanedicarboxylic acid, succinic anhydride, 1,4-cyclohexanedicarboxylic acid and mixtures thereof are preferably used, but the aliphatic dicarboxylic acid should not be construed as being limited thereto.

As the best mode according to the invention, the lactic acid polymer is preferable and polylactic acid and polyglycolic acid are more preferable from the standpoint of high engraving sensitivity.

The content of the polyester (A) in the resin composition according to the invention is preferably from 5 to 95% by weight, more preferably from 15 to 85% by weight, particularly preferably from 25 to 70% by weight, in view of well maintaining the film property and engraving sensitivity.

In the resin composition according to the invention, (B) a binder polymer used together with the polyester (A) can be used as the binder polymer other than the polyester capable of being used together described above. The polyester other than the polyester (A) is also the binder polymer (B).

<(B) Binder Polymer>

The binder polymer (B) includes a polymer containing a carbon-carbon unsaturated bond in at least any one of its main chain and side chain. Hereinafter, the binder polymer (B) is also referred to as "Binder (B)". As the binder (B), among the polyester compounds illustrated below, that having the same structure as the polyester (A) is omitted.

The polymer containing a carbon-carbon unsaturated bond in its main chain includes, for example, SB (polystyrene-polybutadiene), SBS (polystyrene-polybutadiene-polystyrene), SIS (polystyrene-polyisoprene-polystyrene) and SEBS (polystyrene-polyethylene/polybutylene-polystyrene).

When a polymer containing a polymerizable unsaturated group having a high reactivity, for example, a methacryloyl group, is used as the polymer having a carbon-carbon unsaturated bond in its side chain, a film having an extremely high mechanical strength can be prepared. In particular, as for a polyurethane-series or polyester-series thermoplastic elastomer, it is possible to introduce relatively easily the polymerizable unsaturated group having a high reactivity into its molecule. The terminology "to introduce into its molecule" as used herein means and includes cases wherein the polymerizable unsaturated group is bonded at either both terminals or one terminal of the polymer main chain, at a terminal of the polymer side chain, or directly to the polymer main chain or side chain. Specifically, for instance, the polymer having the polymerizable unsaturated group directly introduced at the terminal of the molecule thereof may be used. Alternatively, other method, for example, a method is preferably employed in which a compound having a molecular weight of about several thousands and including plural reactive groups, for example, a hydroxy group, an amino group, an epoxy group, a carboxyl group, an acid anhydride group, a ketone group, a hydrazine residue, an isocyanate group, an isothiocyanate group, a cyclic carbonate group or an ester group is reacted with a connecting agent having plural groups capable of connecting with the above-described reactive group (for example, a polyisocyanate group reacting with the hydroxy group or amino group) to conduct the adjustment of molecular weight and conversion to a terminal bonding group and then the resulting compound is reacted with an organic compound having a group capable of reacting with the terminal connecting group and a polymerizable unsaturated group to introduce the polymerizable unsaturated group into the terminal.

The binder (B) may be a polymer not having a carbon-carbon unsaturated bond may be used as well as the above-described polymer having a carbon-carbon unsaturated bond. The polymer not having a carbon-carbon unsaturated bond includes, for example, a resin easily prepared by adding hydrogen to the olefin portion of the above-described polymer having a carbon-carbon unsaturated bond or a resin easily prepared by polymerization using a raw material previously added hydrogen to its olefin portion (for example, a compound which is obtained by hydrogenation of butadiene, isoprene or the like).

The binder (B) may be an elastomer or a non-elastomer.

The number average molecular weight of the binder polymer is preferably in a range of 1,000 to 1,000,000, more preferably in a range of 5,000 to 500,000. When the number average molecular weight thereof is in the range of 1,000 to 1,000,000, the mechanical strength of the film formed can be ensured. The term "number average molecular weigh" as used herein means a molecular weight obtained by measuring using gel permeation chromatography (GPC) and calculating in terms of standard polystyrene of a known molecular weight.

In the case where the polymer not having a carbon-carbon unsaturated bond is used together with the polymer having a carbon-carbon unsaturated bond, the polymer not having a carbon-carbon unsaturated bond is ordinarily used from 1 to 90% by weight, preferably from 5 to 80% by weight, to the polymer having a carbon-carbon unsaturated bond. In the invention, only the polymer not having a carbon-carbon unsaturated bond may be used as the binder (B).

As the binder (B), a resin easily liquefiable or a resin easily decomposable is preferable. The resin easily decomposable preferably contains in the molecular chain as a monomer unit easily decomposable, for example, a monomer unit derived from styrene, a-methylstyrene, a-methoxystyrene, an acryl ester, a methacryl ester, an ester compound other than those described above, an ether compound, a nitro compound, a carbonate compound, a carbamoyl compound, a hemiacetal ester compound, an oxyethylene compound or an aliphatic cyclic compound. In particular, a polyether, for example, polyethylene glycol, polypropylene glycol or polytetraethylene glycol, an aliphatic polycarbonate, an aliphatic polycarbamate, polymethyl methacrylate, polystyrene, nitrocellulose, polyoxyethylene, polynorbornene, hydrogenated polycyclohexadiene or a polymer having a molecular structure of many branched structures, for example, a dendrimer is the representative example of the resin easily decomposable. Also, a polymer containing a lot of oxygen atoms in its molecular chain is preferable from the standpoint of the decomposability. Among them, the compound having a carbonate group, a carbamate group or a methacryl group in the polymer main chain is preferable in view of the high heat decomposability. For instance, a polyester or polyurethane synthesized using as the raw material, (poly)carbonatediol or (poly)carbonate dicarboxylic acid or a polyamide synthesized using as the raw material, (poly)carbonate diamine is illustrated as a preferable example of the polymer of good heat decomposability. The polymer may contain a polymerizable unsaturated group in the main chain or side chain thereof. In particular, when the polymer has a reactive functional group, for example, a hydroxy group, an amino group or a carboxyl group, it is easy to introduce the polymerizable unsaturated group.

The thermoplastic elastomer is not particularly restricted and includes, for example, a urethane-series thermoplastic elastomer, an ester-series thermoplastic elastomer, an amide-series thermoplastic elastomer or a silicone-series thermoplastic elastomer. In order to more increase the heat decomposability, a polymer wherein an easily decomposable functional group, for example, a carbamoyl group or a carbonate group is introduced into its main chain can be used. Also, it may be used as a mixture with a polymer of higher heat decomposability. Since the thermoplastic elastomer is fluidized by heating, it is possible to be well mixed. The term "thermoplastic elastomer" as used herein means a material which exhibits rubber elasticity at ambient temperature and is fluidized by heating to undergo fabrication as an ordinary thermoplastic plastic. With respect to the molecular structure, the thermoplastic elastomer comprises a soft segment like a polyether or a rubber molecule and a hard segment which prevents plastic deformation around ambient temperature as vulcanized rubber. As the hard segment, various types, for example, a frozen phase, a crystalline phase, a hydrogen bond or an ionic crosslinkage are present.

The kind of thermoplastic elastomer can be selected depending on the use of the resin composition. For instance, in the field requiring solvent resistance, a urethane-series, ester-series, amide-series or fluorine-series thermoplastic elastomer is preferable and in the field requiring heat resistance, a urethane-series, olefin-series, ester-series or fluorine-series thermoplastic elastomer is preferable. Further, the hardness can be widely changed depending on the kind of thermoplastic elastomer.

The non-elastomeric thermoplastic resin is not particularly restricted and includes, for example, a polyester resin, an unsaturated polyester resin, a polyamide resin, a polyamide-imide resin, a polyurethane resin, an unsaturated polyurethane resin, a polysulfone resin, a polyethersulfone resin, a polyimide resin, a polycarbonate resin, a full aromatic polyester resin and a hydrophilic polymer containing a hydroxyethylene unit (for example, a polyvinyl alcohol derivative).

As the binder (B), a hydrophilic polymer is preferable.
<Hydrophilic Polymer>

The term "hydrophilic polymer" as used herein means a polymer which is soluble or swellable in water. Hydrophilic resins broadly have resistance to oil-based ink and are preferably used. Examples of such a hydrophilic resin include a hydrophilic polymer containing hydroxyethylene, a polysaccharide having a hydrophilic functional group including cellulose, an acrylic resin containing a salt structure formed by neutralization of an acidic functional group, for example, sodium polyacrylate or a salt structure formed by neutralization of an amino group or an onium structure, a polyamide resin or polyester resin having incorporated thereto a hydrophilic group, for example, polyethylene oxide, and gelatin.

In view of exhibiting good hydrophilicity, a hydrophilic polymer containing hydroxyethylene, a cellulose containing a polar group, for example, an amino group, a carboxylic acid group, a sulfonic acid group or a sulfuric acid group or a salt structure formed by neutralization of each of these groups, an acrylic resin containing a polar group, for example, an amino group, a carboxylic acid group, a sulfonic acid group or a sulfuric acid group or a salt structure formed by neutralization of each of these groups, or a polyamide resin is preferable.

A hydrophilic polymer containing hydroxyethylene, an acrylic resin containing a polar group, for example, an amino group, a carboxylic acid group, a sulfonic acid group or a sulfuric acid group or a salt structure formed by neutralization of each of these groups, or a polyamide resin is more preferable, and a polyvinyl alcohol or a polyamide resin is particularly preferable. Especially, a polyvinyl alcohol derivative is preferable.

A PVA derivative is preferable as the hydrophilic polymer. The PVA derivative used in the invention means a polymer, copolymer or a modified product thereof containing a hydroxyethylene unit from 0.1 to 100% by mole, preferably from 1 to 98% by mole, more preferably from 5 to 95% by mole. Specifically, polyvinyl alcohol per se is also included. A monomer for forming the copolymer can be appropriately selected from known copolymerizable monomers. The modified product includes those described below.

As the PVA derivative, polyvinyl alcohol and a vinyl alcohol/vinyl acetate copolymer (partially saponified polyvinyl alcohol) are particularly preferably exemplified and the modified products thereof are also particularly preferable.

As the hydrophilic polymer, an individual polymer may be used or plural kinds of polymers may be used as a mixture.

As the hydrophilic polymer, it is particularly preferred to use the PVA derivative together with a hydrophilic polymer not containing a hydroxyethylene unit. The hydrophilic polymer not containing a hydroxyethylene unit is also referred to as a "non-PVA derivative".

The non-PVA derivative means a hydrophilic polymer which has polarity similar to the PVA derivative so as to exhibit compatibility with the PVA derivative. A polyamide obtained by polymerization of adipic acid and 1,6-hexanediamine or polymerization of only ε-caprolactam is water-insoluble and has the polarity different from that of the PVA derivative. A polyamide prepared by introducing a hydrophilic group, for example, polyethylene glycol or piperazine into such a water-insoluble polyamide is preferably used as the non-PVA derivative because the polyamide exhibits compatibility with the PVA derivative due to the function of the hydrophilic group introduced. Specifically, since the hydrophilic polyamide used as the non-PVA derivative has the compatibility with the PVA derivative, it can easily penetrate between molecules of the PVA derivative and the intermolecular force between the molecules of PVA derivative and non-PVA derivative is reduced resulting in imparting flexibility to the polymer.

A polyamide having a polyethylene glycol unit is obtained by undergoing a reaction of ε-caprolactam and/or adipic acid with polyethylene glycol in which both terminals are modified with amines and a hydrophilic polyamide having a piperazine skeleton by undergoing a reaction of ε-caprolactam and/or adipic acid with piperazine. Also, a hydrophilic polyamide having a crosslinkable functional group introduced is obtained by undergoing reaction of an amido group in a hydrophilic polyamide with an epoxy group of glycidyl methacrylate. The non-PVA derivatives may be used individually or as a mixture of two or more thereof.

Examples of the modified product of PVA derivative include a polymer obtained by modifying at least a part of hydroxy groups of hydroxyethylene units to carboxy groups, a polymer obtained by modifying at least a part of hydroxy groups of hydroxyethylene monomer units to (meth)acryloyl groups, a polymer obtained by modifying at least a part of hydroxy groups of hydroxyethylene monomer units to amino groups and a polymer obtained by introducing ethylene glycol, propylene glycol or dimers thereof into at least a part of hydroxy groups of hydroxyethylene monomer units.

The polymer obtained by modifying at least a part of the hydroxy groups to carboxy groups can be obtained by esterification of polyvinyl alcohol or partially saponified polyvinyl alcohol with a polyfunctional carboxylic acid, for example, succinic acid, maleic acid or adipic acid. The amount of carboxy group introduced is preferably from 0.01 to 1.00 mol, more preferably from 0.05 to 0.80 mol, per mol of the hydroxy group.

The polymer obtained by modifying at least a part of the hydroxy groups to (meth)acryloyl groups can be obtained by addition of a glycidyl (meth)acrylate to the above-described carboxyl group-modified polymer or by esterification of polyvinyl alcohol or partially saponified polyvinyl alcohol with (meth)acrylic acid. The amount of (meth)acryloyl group introduced is preferably from 0.01 to 1.00 mol, more preferably from 0.03 to 0.50 mol, per mol of the hydroxy group. The expression of "(meth)acryloyl group" is used as the collective term for an acryloyl group and a methacryloyl group. The expression of "(meth)acrylate" is used as the collective term for an acrylate and a methacrylate. The expression of "(meth)acrylic acid" is used as the collective term for acrylic acid and methacrylic acid.

The polymer obtained by modifying at least a part of hydroxy groups are modified to amino groups can be obtained by esterification of polyvinyl alcohol or partially saponified polyvinyl alcohol with a carboxylic acid containing an amino group, for example, carbamic acid. The amount of amino group introduced is preferably from 0.01 to 1.00 mol, more preferably from 0.05 to 0.70 mol, per mol of the hydroxy group.

The polymer obtained by introducing ethylene glycol, propylene glycol or dimers thereof introduced into at least a part of the hydroxy groups can be obtained by heating polyvinyl alcohol or partially saponified polyvinyl alcohol together with a glycol in the presence of a sulfuric acid catalyst and removing water as a byproduct from the reaction system. The total amount of ethylene glycol, propylene glycol and dimers thereof introduced is preferably from 0.01 to 0.90 mol, more preferably from 0.03 to 0.50 mol, per mol of the hydroxy group.

Among the modified products of PVA derivative, the polymer obtained by modifying at least a part of the hydroxy groups to (meth)acryloyl groups is particularly preferably used. The reason for this is that the direct introduction of unreacted crosslinkable functional group into the hydrophilic polymer makes it possible, for example, to increase strength of the relief-forming layer without using a large amount of polyfunctional monomers as the ethylenically unsaturated monomer described with respect to the polymerizable monomer (C) hereinafter so that good compatibility between the flexibility and the strength of the relief-forming layer can be achieved.

The weight average molecular weight (measured by GPC and calculated in terms of polystyrene) of the hydrophilic polymer is preferably from 5,000 to 500,000. When the weight average molecular weight thereof is 5,000 or more, the polymer is excellent in the configuration retention property as a carrier resin. When the weight average molecular weight thereof is 500,000 or less, the polymer is easily soluble in a solvent, for example, water and advantageous to the preparation of resin composition for laser engraving. The weight average molecular weight thereof is more preferably from 10,000 to 400,000, particularly preferably from 15,000 to 300,000.

The content of the hydrophilic polymer in the resin composition for laser engraving is preferably from 15 to 79% by weight, more preferably from 30 to 65% by weight, based on the total solid content of the resin composition. When the content of the hydrophilic polymer is regulated to 15% by weight or more, the printing durability sufficient for using as the relief printing plate is obtained. When the content of the hydrophilic polymer is regulated to 79% by weight or less, the flexibility sufficient for using as the relief printing plate is obtained without accompanying the lack of other components.

The total content of the PVA derivative and non-PVA derivative when used together in the resin composition for laser engraving is preferably from 30 to 80% by weight, more preferably from 40 to 70% by weight, based on the total solid content of the resin composition. This is because when the total content of the PVA derivative and non-PVA derivative is regulated to 30% by weight or more, it is possible to prevent cold flow of the printing plate precursor, whereas when the total content of the PVA derivative and non-PVA derivative is regulated to 80% by weight or less, the printing durability sufficient for using as the relief printing plate is obtained without accompanying the lack of other components.

In the case of using the PVA derivative together with the non-PVA derivative in the resin composition for laser engraving, the content of the PVA derivative is preferably from 15 to 79% by weight, more preferably from 30 to 65% by weight, based on the total solid content of the resin composition. When the content of the PVA derivative is regulated to 15% by weight or more, the printing durability sufficient for using as the relief printing plate is obtained. When the content of the PVA derivative is regulated to 79% by weight or less, the flexibility sufficient for using as the relief printing plate is obtained without accompanying the lack of other components. On the other hand, the content of the non-PVA derivative is preferably from 1 to 15% by weight, more preferably from 3 to 10% by weight, based on the total solid content of the resin composition. When the content of the non-PVA derivative is regulated to 1% by weight or more, flexibilization of the PVA derivative is efficiently performed so that the flexibility sufficient for using as the relief printing plate is obtained and due to the strong characteristic of the non-PVA derivative, printing durability sufficient for using as the relief printing plate is also obtained. When the content of the non-PVA derivative is regulated to 15% by weight or less, the amount of tacky engraving scrap resulting from the non-PVA derivative is reduced.

According to the invention, although it is possible to use, together with the component (A), the PVA derivative alone or to use the PVA derivative together with the non-PVA derivative, it is preferable to use the PVA derivative together with the non-PVA derivative from the stand point of ensuring aptitudes necessary for the flexographic printing, for example, flexibility or abrasion resistance of film. In case of using the PVA derivative together with the non-PVA derivative, both of the PVA derivative and the non-PVA derivative may be used individually, either of them may be used plurally or both of them are used plurally.

If the hydrophilic polymer is used, the engraving scrap is hydrophilic and as a result, the engraving scrap can be removed by only a simple operation of washing with tap water after the engraving. When a hydrophobic polymer or elastomer, for example, SB (polystyrene-polybutadiene), SBS (polystyrene-polybutadiene-polystyrene), SIS (polystyrene-polyisoprene-polystyrene) or SEBS (polystyrene-polyethylene/polybutylene-polystyrene), a polyurethane or an acrylic resin is used as the main component of binder, cases where the removal of engraving scrap by washing with water is difficult may occur because the engraving scrap is hydrophobic.

Also, it is preferred that when, for example, the PVA derivative is used as the hydrophilic polymer (particularly, non-elastomer having a glass transition temperature of room temperature or higher) according the feature of the invention, the melting in the edge of relief at the engraving resulting from the low glass transition temperature tends to be prevented in comparison with the case of using the above-described hydrophobic polymer or elastomer (mostly having a glass transition temperature of room temperature or lower).

A relatively hydrophobic binder polymer as mentioned above may be used together the hydrophilic polymer. As the relatively hydrophobic binder polymer, a polymer containing a monomer described below as a polymerization component or copolymerization component is used in order to adjust properties, for example, hardness or flexibility of a film at the preparation and compatibility with other component, for example, a polymerizable compound or an initiator.

Specifically, a (meth)acrylate having a hydroxy group, for example, 2-hydroxyethyl (meth)acrylate, 2-hydroxypropyl (meth)acrylate, 2-hydroxybutyl (meth)acrylate, 3-chloro-2-hydroxypropyl(meth)acrylate or β-hydroxy-β'-(meth)acryloyloxyethyl phthalate, an alkyl(meth)acrylate, for example, methyl(meth)acrylate, ethyl(meth)acrylate, propyl(meth)acrylate, butyl(meth)acrylate, isoamyl(meth)acrylate, 2-ethylhexyl(meth)acrylate, lauryl(meth)acrylate or stearyl(meth)acrylate, a cycloalkyl(meth)acrylate, for example, cyclohexyl (meth)acrylate, a halogenated alkyl(meth)acrylate, for example, chloroethyl(meth)acrylate or chloropropyl(meth)acrylate, an alkoxyalkyl(meth)acrylate, for example, methoxyethyl(meth)acrylate, ethoxyethyl(meth)acrylate or butoxyethyl(meth)acrylate, a phenoxyalkyl(meth)acrylate, for example, phenoxyethyl acrylate or nonylphenoxyethyl (meth)acrylate, an alkoxyalkylene glycol(meth)acrylate, for example, ethoxydiethylene glycol(meth)acrylate, methoxytriethylene glycol(meth)acrylate or methoxydipropylene glycol(meth)acrylate, a (meth)acrylamide, for example, (meth)acrylamide, diacetone(meth)acrylamide or N,N'-methylenebis(meth)acrylamide, a compound having only one ethylenically unsaturated bond, for example, 2,2-dimethylaminoethyl(meth)acrylate, 2,2-diethylaminoethyl(meth) acrylate, N,N-dimethylaminoethyl(meth)acrylamide or N,N-dimethylaminopropyl(meth)acrylamide, and a compound having two or more ethylenically unsaturated bonds, for instance, a polyethylene glycol di(meth)acrylate, for example, diethylene glycol di(meth)acrylate, a polypropylene glycol di(meth)acrylate, for example, dipropylene glycol di(meth)acrylate, trimethylolpropane tri(meth)acrylate, pentaerythritol tri(meth)acrylate, pentaerythritol tetra(meth) acrylate, glycerol tri(meth)acrylate, a polyvalent (meth)acrylate obtained by an addition reaction of ethylene glycol diglycidyl ether with a compound having an ethylenically unsaturated bond and an active hydrogen atom, for example, an unsaturated carboxylic acid or unsaturated alcohol, a polyvalent(meth)acrylate obtained by an addition reaction of an unsaturated epoxy compound, for example, glycidyl (meth) acrylate with a compound having an active hydrogen atom, for example, an carboxylic acid or amine, a polyvalent(meth) acrylamide, for example, methylenebis(meth)acrylamide, or a polyvalent vinyl compound, for example, divinylbenzene are exemplified. The monomers may be used individually or in combination of two or more thereof in the invention.

As the monomer for the polymerization component, 2-hydroxyethyl(meth)acrylate, 2-hydroxypropyl(meth)acrylate, 2-hydroxybutyl(meth)acrylate, an alkoxyalkylene glycol (meth)acrylate, for example, ethoxydiethylene glycol(meth) acrylate, methoxytriethylene glycol(meth) acrylate or methoxydipropylene glycol(meth)acrylate, (meth)acrylamide, diacetone(meth)acrylamide, cyclohexyl(meth)acrylate, benzyl(meth)acrylate and N-acryloylmorpholine are preferable in view of a film-forming property. Among them, the acrylate is particularly preferable from the standpoint of ensuring flexibility of the polymer obtained.

Further, the polymer witch may be used together includes the following.

Specifically, a polymer containing any one of an olefin bond and a carbon-carbon triple bond in its main chain is exemplified. Examples thereof include SB (polystyrene-polybutadiene), SBS (polystyrene-polybutadiene-polystyrene), SIS (polystyrene-polyisoprene-polystyrene) and SEBS (polystyrene-polyethylene/polybutylene-polystyrene).

The binder polymer which may be used together with the hydrophilic polymer is preferably used in an amount for increasing the film property without accompanying decrease in the engraving sensitivity. The content thereof is preferably from 1 to 50% by weight, more preferably from 1 to 30% by weight, most preferably from 1 to 10% by weight, based on the total binder polymer.

In view of engraving sensitivity, a rate of the polyester (A) and the binder (B) used is preferably from 0.1:99.9 to 99.9: 0.1, more preferably from 5:95 to 80:20, particularly preferably from 10:90 to 50:50, in terms of a ratio of (A): (B) taking the total amount of (A) and (B) 100.

The polyester (A) may be incorporated into the resin composition in any state of homogeneous form, particulate form and fibrous form to form a film and from the stand point of well maintaining hardness of the film and abrasion resistance, it is preferred to form the film in the homogeneous form or particulate form.

In case of using the polyester (A) together with the bonder (B) which is a hydrophilic polymer, it is preferred to mix the polyester (A) with the binder (B) in the sate of an emulsion (also referred to as a suspension or a latex), because a solvent for preparing the composition is mainly water or an alcohol. Preferable examples of the polylactic acid emulsion include Landy PL series (produced by Miyoshi Oil and Fat Co., Ltd.) and Bionole (produced by Showa Highpolymer Co., Ltd.).

In case of using the polyester (A) in the state of an emulsion, a surfactant or a stabilizer for assisting dispersion of the polyester (A) may be added in order to prevent aggregation and precipitation of the polyester (A) during preparation or drying of the composition.

The resin composition according to the invention preferably contains (C) a polymerizable compound, (D) a light-toheat conversion agent, (E) a polymerization initiator and (F) a plasticizer. These components are described in detail below.

<(C) Polymerizable Compound>

The polymerizable compound (C) according to the invention means a compound having at least one carbon-carbon unsaturated bond capable of undergoing a radical polymerization triggered by the generation of an initiation radical derived from the polymerization initiator.

The polymerizable compound (C) is described in greater detail below taking a case wherein an addition polymerizable compound is used as an example.

The polymerizable compound preferably used in the invention includes an addition-polymerizable compound having at least one ethylenically unsaturated double bond. The addition-polymerizable compound is preferably selected from compounds having at least one, preferably two or more, terminal ethylenically unsaturated double bonds. Such compounds are widely known in the field of art and they can be used in the invention without any particular limitation. The compound has a chemical form, for example, a monomer, a prepolymer, specifically, a dimer, a trimer or an oligomer, or a copolymer thereof, or a mixture thereof. Examples of the monomer include unsaturated carboxylic acids (for example, acrylic acid, methacrylic acid, itaconic acid, crotonic acid, isocrotonic acid or maleic acid) and esters or amides thereof. Preferably, esters of an unsaturated carboxylic acid with an aliphatic polyhydric alcohol compound and amides of an unsaturated carboxylic acid with an aliphatic polyvalent amine compound are used. An addition reaction product of an unsaturated carboxylic acid ester or amide having a nucleophilic substituent, for example, a hydroxy group, an amino group or a mercapto group, with a monofunctional or polyfunctional isocyanate or epoxy, or a dehydration condensation reaction product of the unsaturated carboxylic acid ester or amide with a monofunctional or polyfunctional carboxylic acid is also preferably used. Furthermore, an addition reaction product of an unsaturated carboxylic acid ester or amide having an electrophilic substituent, for example, an isocyanato group or an epoxy group with a monofunctional or polyfunctional alcohol, amine or thiol, or a substitution reaction product of an unsaturated carboxylic acid ester or amide having a releasable substituent, for example, a halogen atom or a tosyloxy group with a monofunctional or polyfunctional alcohol, amine or thiol is also preferably used. In addition, compounds in which the unsaturated carboxylic acid described above is replaced by an unsaturated phosphonic acid, styrene, vinyl ether or the like can also be used.

With respect to specific examples of the monomer, which is an ester of an aliphatic polyhydric alcohol compound with an unsaturated carboxylic acid, as an acrylic acid ester, for example, ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate and polyester acrylate oligomer are recited.

As a methacrylic acid ester, for example, tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2-hydroxypropoxy)phenyl]dimethylmethane and bis[p-(methacryloxyethoxy)phenyl]dimethylmethane are recited.

As an itaconic acid ester, for example, ethylene glycol diitaconate, propylene glycol diitaconate, 1,3-butanediol diitaconate, 1,4-butanediol diitaconate, tetramethylene glycol diitaconate, pentaerythritol diitaconate and sorbitol tetraitaconate are recited.

As a crotonic acid ester, for example, ethylene glycol dicrotonate, tetramethylene glycol dicrotonate, pentaerythritol dicrotonate and sorbitol tetracrotonate are recited.

As an isocrotonic acid ester, for example, ethylene glycol diisocrotonate, pentaerythritol diisocrotonate and sorbitol tetraisocrotonate are recited.

As a maleic acid ester, for example, ethylene glycol dimaleate, triethylene glycol dimaleate, pentaerythritol dimaleate and sorbitol tetramaleate are recited.

Other examples of the ester, which can be preferably used, include aliphatic alcohol esters described in JP-B-46-27926, JP-B-51-47334 and JP-A-57-196231, esters having an aromatic skeleton described in JP-A-59-5240, JP-A-59-5241 and JP-A-2-226149, and esters containing an amino group described in JP-A-1-165613.

The above-described ester monomers can also be used as a mixture.

Specific examples of the monomer, which is an amide of an aliphatic polyvalent amine compound with an unsaturated carboxylic acid, include methylene bisacrylamide, methylene bismethacrylamide, 1,6-hexamethylene bisacrylamide, 1,6-hexamethylene bismethacrylamide, diethylenetriamine trisacrylamide, xylylene bisacrylamide and xylylene bismethacrylamide.

Other preferable examples of the amide monomer include amides having a cyclohexylene structure described in JP-B-54-21726.

Urethane type addition polymerizable compounds produced using an addition reaction between an isocyanate and a hydroxy group are also preferably used, and specific examples thereof include vinylurethane compounds having two or more polymerizable vinyl groups per molecule obtained by adding a vinyl monomer containing a hydroxy group represented by formula (V) shown below to a polyisocyanate compound having two or more isocyanate groups per molecule, described in JP-B-48-41708.

$$CH_2\!\!=\!\!C(R)COOCH_2CH(R')OH \qquad (V)$$

wherein R and R' each independently represents H or $CH_3$.

Also, urethane acrylates described in JP-A-51-37193, JP-B-2-32293 and JP-B-2-16765, and urethane compounds having an ethylene oxide skeleton described in JP-B-58-49860, JP-B-56-17654, JP-B-62-39417 and JP-B-62-39418 are preferably used.

Furthermore, the resin composition capable of being cured at short times can be obtained by using an addition polymerizable compound having an amino structure or a sulfide structure in its molecule described in JP-A-63-277653, JP-A-63-260909 and JP-A-1-105238.

Other examples include polyfunctional acrylates and methacrylates, for example, polyester acrylates and epoxy acrylates obtained by reacting an epoxy resin with acrylic acid or methacrylic acid described in JP-A-48-64183, JP-B-49-43191 and JP-B-52-30490. Specific unsaturated compounds described in JP-B-46-43946, JP-B-1-40337 and JP-B-1-40336, and vinylphosphonic acid series compounds described in JP-A-2-25493 can also be exemplified. In some cases, structure containing a perfluoroalkyl group described in JP-A-61-22048 can be preferably used. Moreover, photo-curable monomers or oligomers described in *Nippon Sec-chaku Kyokaishi* (*Journal of Japan Adhesion Society*), Vol. 20, No. 7, pages 300 to 308 (1984) can also be used.

In view of the photo-speed, a structure having a large content of unsaturated groups per molecule is preferred and in many cases, a difunctional or more functional compound is preferred. In order to increase the strength of image area, that is, cured layer, a trifunctional or more functional compound is preferred. A combination use of compounds different in the functional number or in the kind of polymerizable group (for example, an acrylic acid ester, a methacrylic acid ester, a styrene compound or a vinyl ether compound) is an effective method for controlling both the sensitivity and the strength. The polymerizable compound is preferably used in an amount from 10 to 60% by weight, more preferably from 15 to 40% by weight, based on the nonvolatile component in the resin composition. The polymerizable compounds may be used individually or in combination of two or more thereof. By using the polymerizable compound, the film physical property, for example, brittleness or flexibility can also be adjusted.

Before and/or after the laser decomposition, the resin composition for laser engraving containing the polymerizable compound can be polymerized and cured with energy, for example, light or heat.

Preferable specific examples of the polymerizable compound for use in the resin composition for laser engraving according to the invention are set forth below.

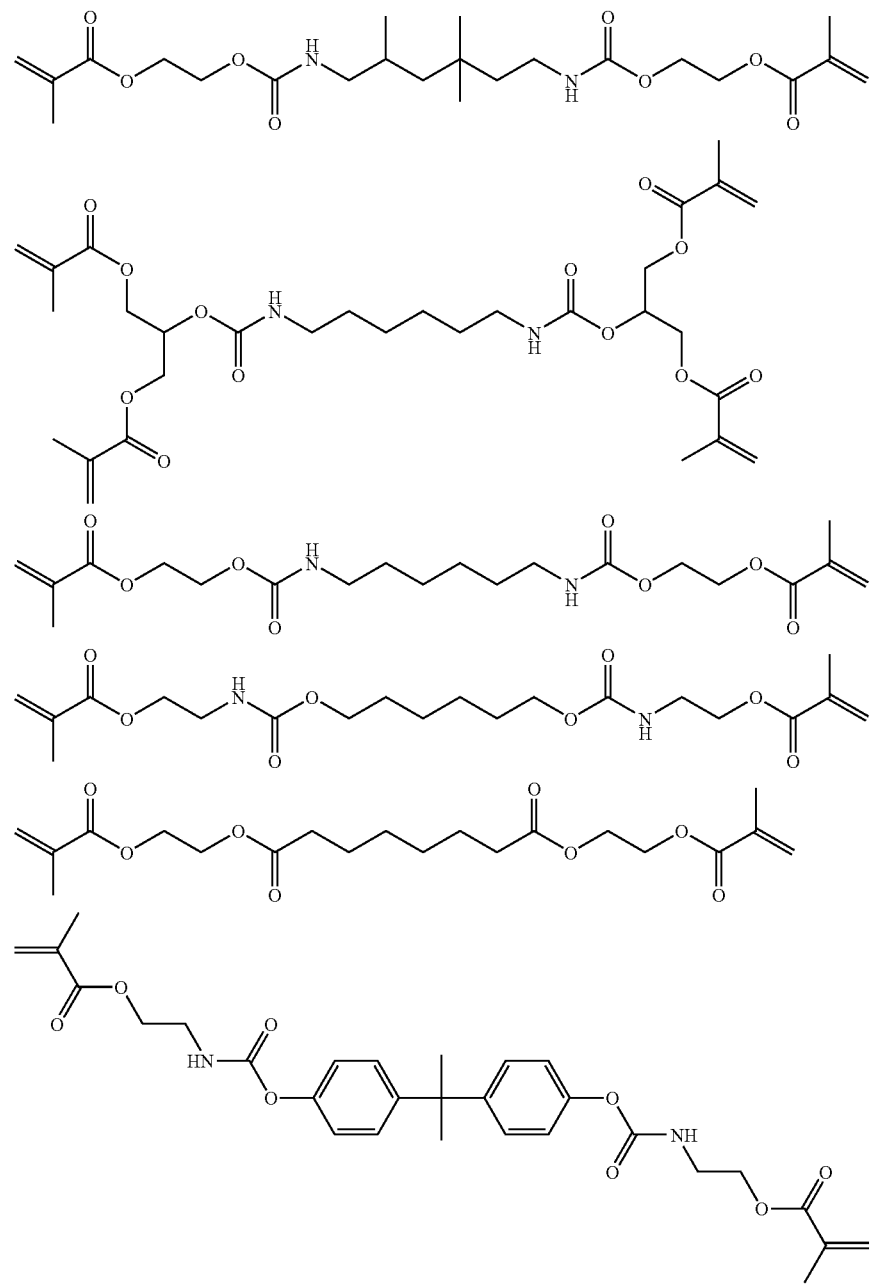

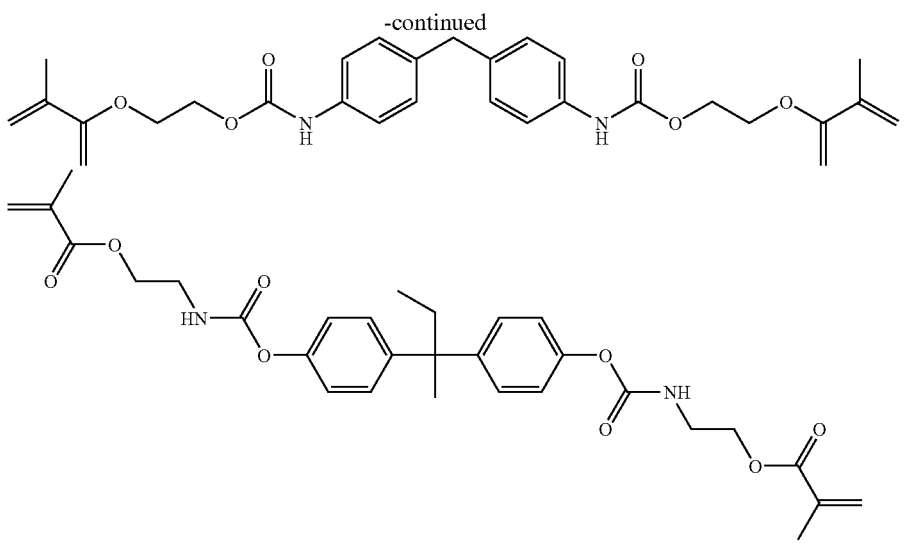

Of the polymerizable compounds used in the invention, a polymerizable compound containing a sulfur (S) atom is particularly preferred from the standpoint that melting in the edge of relief hardly occurs and a sharp relief is easily obtained. Specifically, it is preferred to contain S atom in the crosslinked network.

Although the polymerizable compound containing S atom may be used together with the polymerizable compound not containing S atom, it is preferred to use the polymerizable compound containing S atom alone from the standpoint that the melting in the edge of relief hardly occurs. Further, it is also possible to contribute, for example, to the adjustment of flexibility of film that a plurality of the polymerizable compounds containing S atom having different characteristics are used together.

Specific examples of the polymerizable compound containing S atom are set forth below.

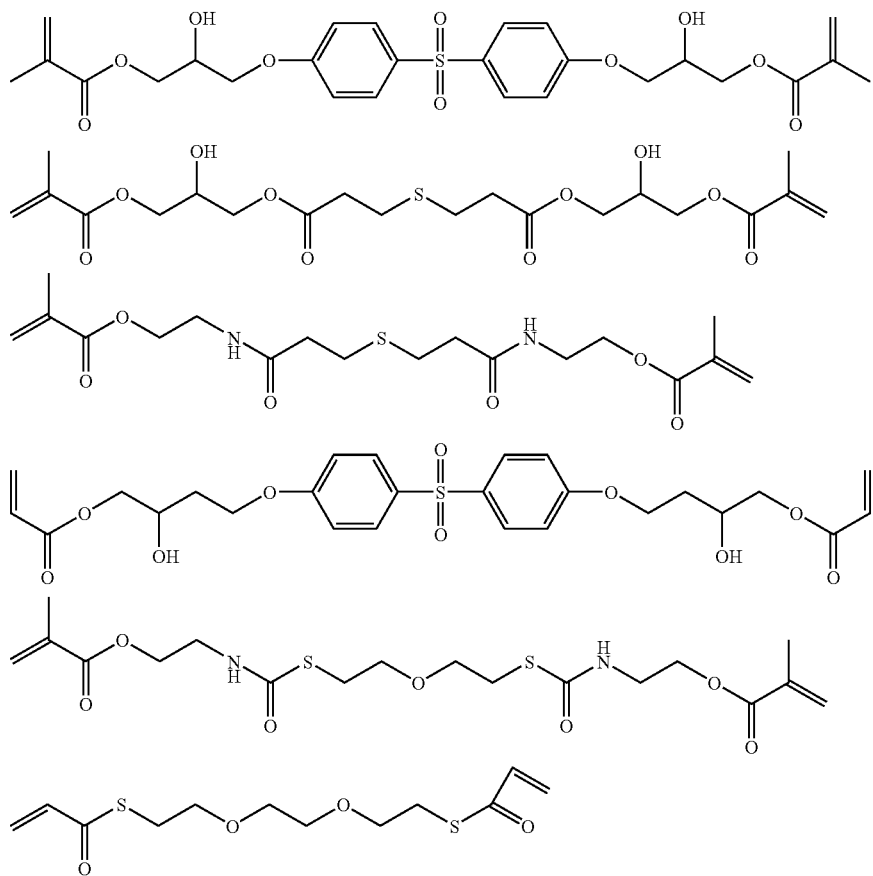

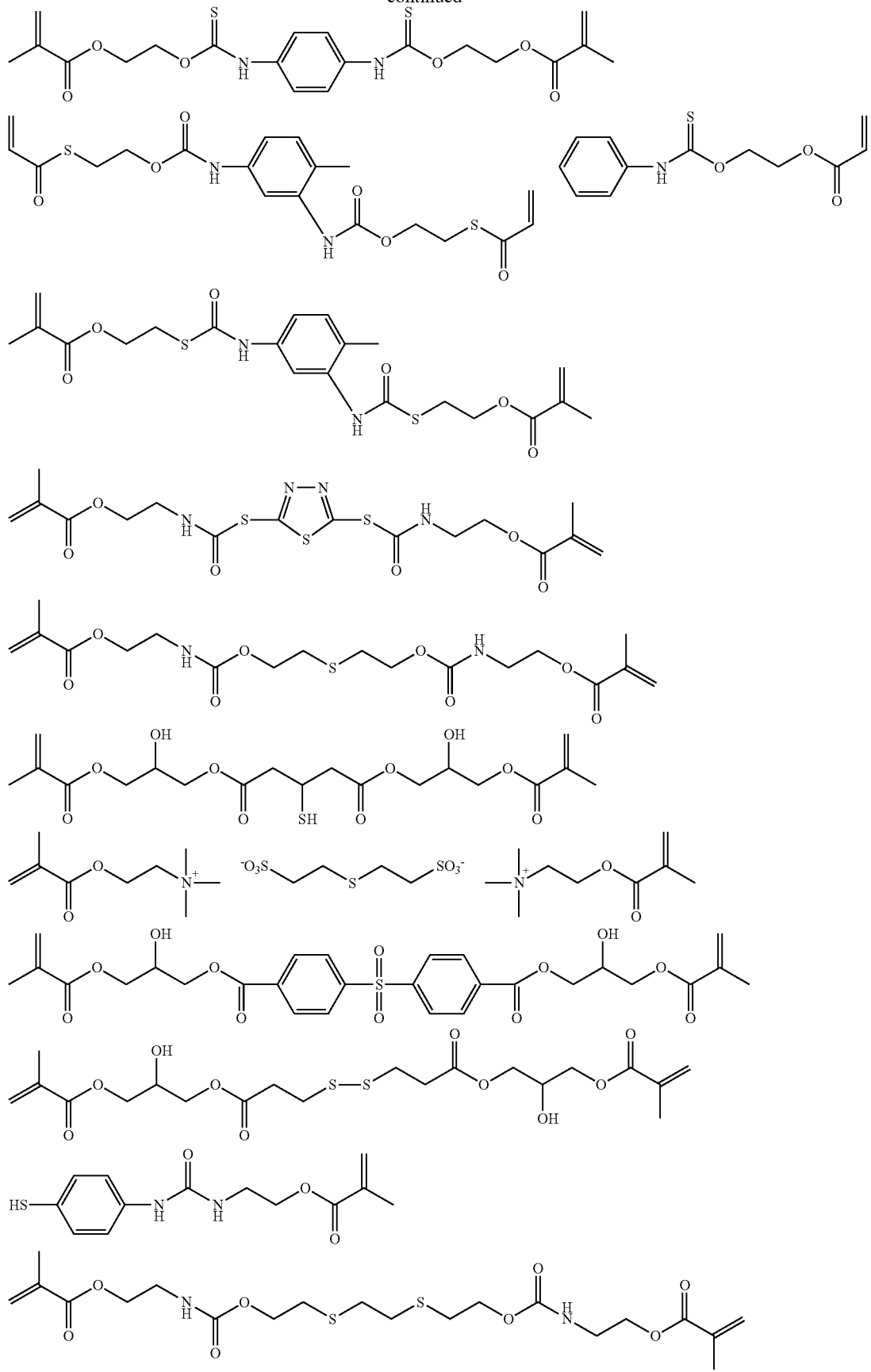

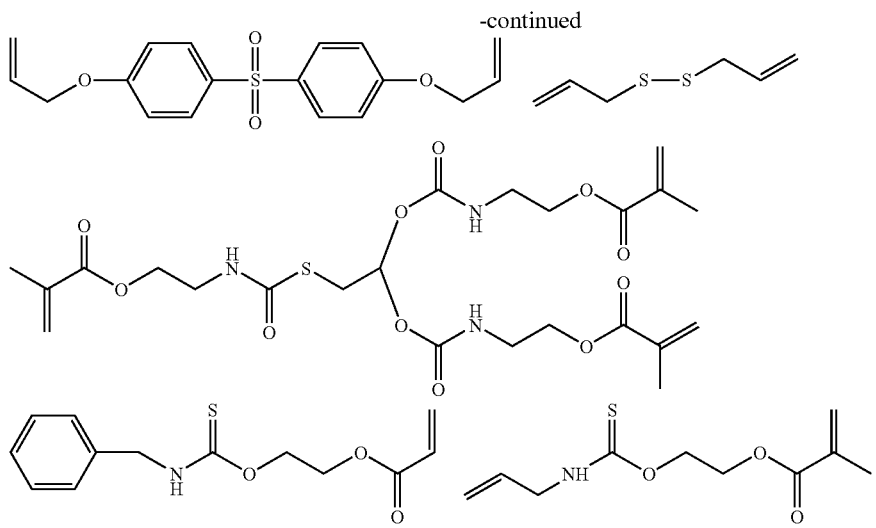

((D) Light-to-Heat Conversion Agent>

The light-to-heat conversion agent (D) according to the invention has an absorption maximum wavelength in a range of 700 to 1,300 nm. In case of performing laser engraving of the resin composition for laser engraving according to the invention using a laser (YAG laser, semiconductor laser, fiber laser or surface-emitting laser) emitting an infrared ray of 700 to 1,300 nm, the light-to-heat conversion agent (D) is employed as an infrared absorbing agent. The light-to-heat conversion agent (D) absorbs the laser light to generate heat and accelerates heat decomposition of the resin composition. The light-to-heat conversion agent (D) for use in the invention includes dyes and pigments each having an absorption maximum in a wavelength range of 700 to 1,300 nm.

As the dye, commercially available dyes and known dyes described in literatures, for example, *Senryo Binran (Dye Handbook)* compiled by The Society of Synthetic Organic Chemistry, Japan (1970) can be used. Specifically, the dyes include azo dyes, metal complex azo dyes, pyrazolone azo dyes, naphthoquinone dyes, anthraquinone dyes, phthalocyanine dyes, carbonium dyes, diimmonium compounds, quinoneimine dyes, methine dyes, cyanine dyes, squarylium dyes, pyrylium salts and metal thiolate complexes.

Examples of preferable dye include cyanine dyes described, for example, in JP-A-58-125246, JP-A-59-84356, JP-A-59-202829 and JP-A-60-78787, methine dyes described, for example, in JP-A-58-173696, JP-A-58-181690 and JP-A-58-194595, naphthoquinone dyes described, for example, in JP-A-58-112793, JP-A-58-224793, JP-A-59-48187, JP-A-59-73996, JP-A-60-52940 and JP-A-60-63744, squarylium dyes described, for example, in JP-A-58-112792, and cyanine dyes described, for example, in British Patent 434,875.

Also, near infrared absorbing sensitizers described in U.S. Pat. No. 5,156,938 are preferably used. Further, substituted arylbenzo(thio)pyrylium salts described in U.S. Pat. No. 3,881,924, trimethinethiapyrylium salts described in JP-A-57-142645 (corresponding to U.S. Pat. No. 4,327,169), pyrylium compounds described in JP-A-58-181051, JP-A-58-220143, JP-A-59-41363, JP-A-59-84248, JP-A-59-84249, JP-A-59-146063 and JP-A-59-146061, cyanine dyes described in JP-A-59-216146, pentamethinethiopyrylium salts described in U.S. Pat. No. 4,283,475, and pyrylium compounds described in JP-B-5-13514 (the term "JP-B" as used herein means an "examined Japanese patent publication") and JP-B-5-19702 are also preferably used. Other preferable examples of the dye include near infrared absorbing dyes represented by formulae (I) and (II) in U.S. Pat. No. 4,756,993.

Other preferable examples of the light-to-heat conversion agent (D) according to the invention include specific indolenine cyanine dyes described in JP-A-2002-278057.

Of the dyes, cyanine dyes, squarylium dyes, pyrylium dyes, nickel thiolate complexes and indolenine cyanine dyes are preferred. Further, cyanine dyes and indolenine cyanine dyes are more preferred.

Specific examples of the cyanine dye preferably used in the invention include those described in Paragraph Nos. [0017] to [0019] of JP-A-2001-133969, Paragraph Nos. [0012] to [0038] of JP-A-2002-40638 and Paragraph Nos. [0012] to [0023] of JP-A-2002-23360.

The dye represented by formula (d) or formula (e) shown below is preferable from the standpoint of light-to-heat conversion property.

Formula (d)

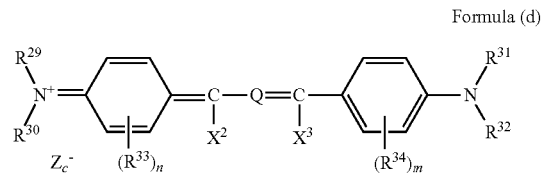

In formula (d), $R^{29}$ to $R^{32}$ each independently represents a hydrogen atom, an alkyl group or an aryl group. $R^{33}$ and $R^{34}$ each independently represents an alkyl group, a substituted oxy group or a halogen atom. n and m each independently represents an integer of 0 to 4. $R^{29}$ and $R^{30}$ or $R^{31}$ and $R^{32}$ may be combined with each other to form a ring. Also, $R^{29}$ and/or $R^{30}$ and $R^{33}$ or $R^{31}$ and/or $R^{32}$ and $R^{34}$ may be combined with each other to form a ring. Further, when plural $R^{33}$s or $R^{34}$s are present, the $R^{33}$s or $R^{34}$s may be combined with each other to form a ring. $X^2$ and $X^3$ each independently represents a hydrogen atom, an alkyl group or an aryl group, provided that at least one of $X^2$ and $X^3$ represents a hydrogen atom or an alkyl group. Q represents a trimethine group which may have a substituent or a pentamethine group which may have a substituent or may form a ring structure together with a divalent organic group. Zc⁻ represents a counter anion. However, Zc⁻ is not necessary when the dye represented by formula (d) has an anionic substituent in the structure thereof and neutralization of charge is not needed. Preferable examples of the counter ion for Zc⁻ include a halogen ion, a perchlorate ion, a tetrafluoroborate ion, a hexafluorophosphate ion and a sulfonate ion, and particularly preferable examples thereof include a perchlorate ion, a hexafluorophosphate ion and an arylsulfonate ion in view of the preservation stability of a coating solution for resin composition layer.

Specific examples of the dye represented by formula (d) preferably used in the invention include those illustrated below.

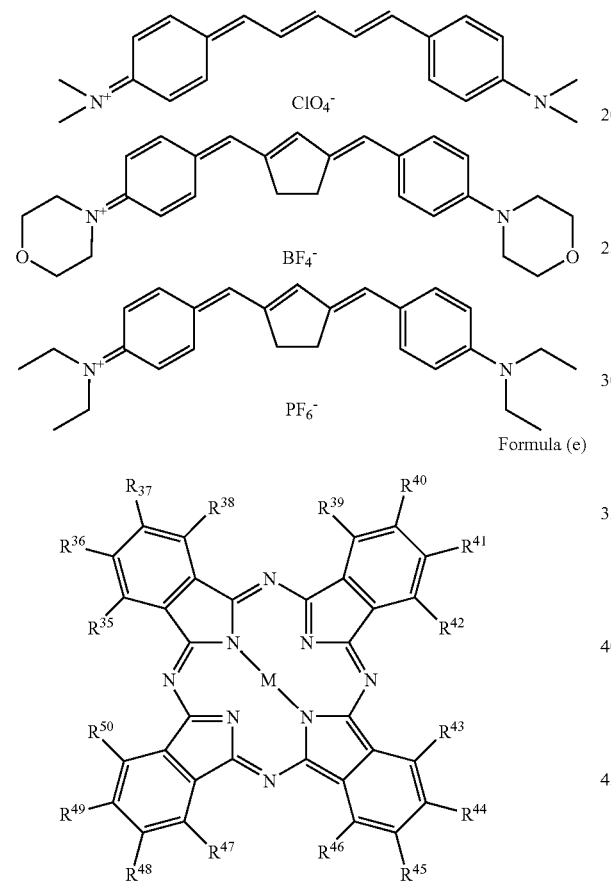

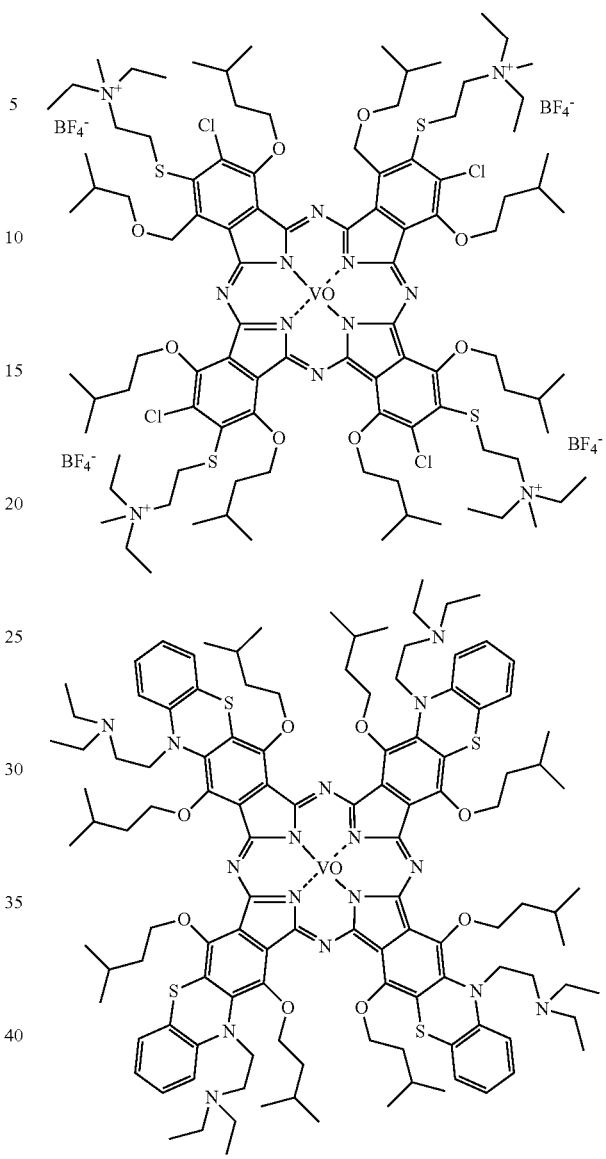

In formula (e), $R^{35}$ to $R^{50}$ each independently represents a hydrogen atom, a halogen atom, a cyano group, an alkyl group, an aryl group, an alkenyl group, an alkynyl group, a hydroxy group, a carbonyl group, a thio group, a sulfonyl group, a sulfinyl group, an oxy group, an amino group or an onium salt structure. When a substituent can be introduced into these groups, they may have the substituent. M represents two hydrogen atoms, a metal atom, a halometal group or an oxymetal group. Examples of the metal atom included therein include atoms of Groups IA, IIA, IIIB and IVB of the Periodic Table, transition metals of the first, second and third periods, and lanthanoid elements. Among them, copper, magnesium, iron, zinc, cobalt, aluminum, titanium and vanadium are preferred.

Specific examples of the dye represented by formula (e) preferably used in the invention include those illustrated below.

Examples of the pigment for use in the invention include commercially available pigments and pigments described in Colour Index (C.I.), Saishin Ganryo Binran (Handbook of the Newest Pigments) compiled by Pigment Technology Society of Japan (1977), Saishin Ganryo Oyou Gijutsu (Newest Application on Technologies for Pigments), CMC Publishing Co., Ltd. (1986) and Insatsu Ink Gijutsu (Printing Ink Technology), CMC Publishing Co., Ltd. (1984).

Examples of the pigment include black pigments, yellow pigments, orange pigments, brown pigments, red pigments, purple pigments, blue pigments, green pigments, fluorescent pigments, metal powder pigments and polymer-bonded dyes. Specific examples of usable pigment include insoluble azo pigments, azo lake pigments, condensed azo pigments, chelated azo pigments, phthalocyanine pigments, anthraquinone pigments, perylene and perynone pigments, thioindigo pigments, quinacridone pigments, dioxazine pigments, isoindolinone pigments, quinophthalone pigments, dying lake pigments, azine pigments, nitroso pigments, nitro pigments, natural pigments, fluorescent pigments, inorganic pigments and carbon black. Of the pigments, carbon black is preferred.

The pigment may be used without undergoing surface treatment or may be used after the surface treatment. For the surface treatment, a method of coating a resin or wax on the surface, a method of attaching a surfactant and a method of bonding a reactive substance (for example, a silane coupling agent, an epoxy compound or polyisocyanate) to the pigment surface. The surface treatment methods are described in *Kinzoku Sekken no Seishitsu to Oyo* (*Properties and Applications of Metal Soap*), Saiwai Shobo, *Insatsu Ink Gijutsu* (*Printing Ink Technology*), CMC Publishing Co., Ltd. (1984), and *Saishin Ganryo Oyo Gijutsu* (*Newest Application on Technologies for Pigments*), CMC Publishing Co., Ltd. (1986).

The pigment has a particle size of preferably from 0.01 to 10 µm, more preferably from 0.05 to 1 µm, particularly preferably from 0.1 to 1 µm. When the particle size of the pigment is 0.01 µm or more, stability of the pigment dispersion in a coating solution increases and when it is 10 µm or less, uniformity of the resin composition layer is good.

For dispersing the pigment, a known dispersion technique for use in the production of ink or toner may be used. Examples of the dispersing machine include an ultrasonic dispersing machine, a sand mill, an attritor, a pearl mill, a super-mill, a ball mill, an impeller, a disperser, a KD mill, a colloid mill, a dynatron, a three roll mill and a pressure kneader. The dispersing machines are described in detail in *Saishin Ganryo Oyo Gijutsu* (*Newest Application on Technologies for Pigments*), CMC Publishing Co., Ltd. (1986).

The cyanine compounds and phthalocyanine compounds are preferable in the invention in view of high engraving sensitivity and the cyanine compounds and phthalocyanine compounds are particularly preferable. Further, it is preferable to use a combination (condition) of the light-to-heat conversion agent and the hydrophilic polymer in which heat decomposition temperature of the light-to-heat conversion agent is same as or higher than heat decomposition temperature of the hydrophilic polymer, because the engraving sensitivity tends to increase.

Specific examples of the light-to-heat conversion agent for use in the invention include cyanine dyes, for example, heptamethyne cyanine dyes, oxonol dyes, for example, pentamethyne oxonol dyes, indolium dyes, benzindolium dyes, benzothiazolium dyes, quinolinium dyes and phthalide compounds reacted with developers. It is not necessary true that all cyanine dyes have the light absorbing properties described above. The light absorbing properties very largely vary according, for example, to the kind and position of substituent in its molecule, number of conjugate bond, kind of counter ion or surrounding environment in which the dye molecule is present. Further, ordinarily commercially available laser dyes, supersaturation absorption dyes and near infrared absorption dyes may also be used. Examples of the laser dye include ADS740PP, ADS745HT, ADS760MP, ADS740WS, ADS765WS, ADS745HO, ADS790NH and ADS800NH, all trade names of American Dye Source, Inc. (Canada), and NK-3555, NK-3509 and NK-3519, all trade names of Hayashibara Biochemical Labs., Inc. Examples of the near infrared absorption dye include ADS775MI, ADS775MP, ADS775HI, ADS775PI, ADS775PP, ADS780MT, ADS780BP, ADS793EI, ADS798MI, ADS798MP, ADS800AT, ADS805PI, ADS805PP, ADS805PA, ADS805PF, ADS812MI, ADS815EI, ADS818HI, ADS818HT, ADS822MT, AD830AT, ADS838MT, ADS840MT, ADS845BI, ADS905AM, ADS956BI, ADS1040T, ADS1040P, ADS1045P, ADS1050P, ADS1060A, ADS1065A, ADS1065P, ADS1100T, ADS1120F, ADS1120P, ADS780WS, ADS785WS, ADS790WS, ADS805WS, ADS820WS, ADS830WS, ADS850WS, ADS780HO, ADS810CO, ADS820HO, ADS821NH, ADS840NH, ADS880MC, ADS890MC and ADS920MC, all trade names of American Dye Source, Inc. (Canada), YKR-2200, YKR-2081, YKR-2900, YKR-2100 and YKR-3071, all trade names of Yamamoto Chemicals Inc., SDO-1000B, trade name of Arimoto Chemical Co., Ltd., NK-3508 and NKX-114, all trade names of Hayashibara Biochemical Labs., Inc. However, the invention should no be construed as being limited thereto. As the phthalide compound reacted with developer, those described in Japanese Patent 3271226 may also be used. Further, a phosphoric ester metal compound, for example, complexes of phosphoric ester and cupper salt described in JP-A-6-345820 and WO99/10354 may be used. Moreover, ultrafine particles having a light absorption property in a near infrared region and a number average particle size of preferably 0.3 µm or less, more preferably 0.1 µm or less, still more preferably 0.08 µm or less, may be used. For instance, ultrafine particles of metal oxide, for example, yttrium oxide, tin oxide and/or indium oxide, copper oxide or iron oxide and of metal, for example, gold, silver, palladium or platinum are illustrated. Moreover, fine particles, for example, of glass having a number average particle size of preferably 5 µm or less, more preferably 1 µm or less, to which a metal ion, for example, ion of copper, tin, indium, yttrium, chromium, cobalt, titanium, nickel, vanadium or rare earth element is added may also be used. Furthermore, a dye which reacts with a photosensitive resin composition to change its light absorption wavelength may be incorporated into microcapsules. In such a case, a number average particle size of the microcapsule is preferably 10 µm or less, more preferably 5 µm or less, still more preferably 1 µm or less. Ion exchanger fine particles to which a metal ion, for example, ion of copper, tin, indium, yttrium or rare earth element is adsorbed may also be used. The ion exchanger fine particle may be an organic resin fine particle or an inorganic fine particle. Examples of the inorganic fine particle include fine particle of amorphous zirconium phosphate, amorphous zirconium silicate phosphate, amorphous zirconium hexamethaphosphate, layered zirconium phosphate, reticular zirconium phosphate, zirconium tungstate and zeolite. Examples of the organic resin fine particle include fine particle of ordinarily used ion exchange resin and ion exchange cellulose.

On the other hand, any carbon black can be used regardless of the use (for example, for color, for rubber or for dry cell) as well as carbon black classified according to ASTM, as long as dispersion stability of the composition is not damaged. The carbon black includes, for example, furnace black, thermal black, channel black, lamp black and acetylene black. A black coloring agent, for example, carbon black can be used as a color chip or a color paste prepared by previously dispersing it in nitrocellulose or a binder using a dispersing agent, if desired, in order to facilitate dispersion. Such a color chip or a color paste is easily available as a commercial product.

In the invention, it is possible to use carbon black having a relatively low specific surface area and relatively low DBP absorptive capacity and finely divided carbon black having high specific surface area.

Preferable examples of carbon black include Printex® U, Printex® A and Spezialschwarz® 4 (available from Degussa AG).

In the invention, conductive carbon black having the specific surface area of 150 $m^2$/g or more and the DBP absorptive capacity of 150 ml/100 g or more is preferable from the standpoint of increase in engraving sensitivity resulting from efficiently transferring the heat generated by light-to-heat conversion to the surrounding polymer or the like.

The specific surface area is more preferably 250 m²/g or more, particularly preferably 500 m²/g or more. The DBP absorptive capacity is more preferably 200 ml/100 g or more, particularly preferably 250 ml/100 g or more. The carbon black may be acidic carbon black or basic carbon black. Carbon black is preferably basic carbon black.

Appropriate conductive carbon blacks having the specific surface area up to about 1,500 m²/g and the DBP absorptive capacity up to about 550 ml/100 g are commercially available by the names of Ketjenblack® EC300J and Ketjenblack® EC600J (available from Akzo), Printex® XE (available from Degussa AG), Black Pearls® 2000 (available from Cabot Corp.) and Ketjenblack (produced by Lion Corp.).

The concentration of the light-to-heat conversion agent added to the resin composition for laser engraving may be considerably varied depending on the molecular extinction coefficient thereof inherent in the molecule and is preferably in a range of 0.01 to 20% by weight, more preferably in a range of 0.05 to 10% by weight, particularly preferably in a range of 0.1 to 5% by weight, based on the total solid content of the resin composition.

<(E) Polymerization Initiator>

As the polymerization initiator, initiators known to those skilled in the art can be used without limitation. Specifically, many compounds described in literature, for example, Bruce M. Monroe et al., *Chemical Review*, 93, 435 (1993), R. S. Davidson, *Journal of Photochemistry and Biology A: Chemistry*, 73, 81 (1993), J. P. Faussier, *Photoinitiated Polymerization-Theory and Applications: Rapra Review* Vol. 9, Report, Rapra Technology (1998) or M. Tsunooka et al., *Prog. Polym. Sci.*, 21, 1 (1996) can be used. Further, a group of compounds undergoing oxidative or reductive bond cleavage as described, for example, in F. D. Saeva, *Topics in Current Chemistry*, 156, 59 (1990), G. G. Maslak, *Topics in Current Chemistry*, 168, 1 (1993), H. B. Shuster et al., *JACS*, 112, 6329 (1990) and I. D. F. Eaton et al., *JACS*, 102, 3298 (1980) are known.

With respect to specific examples of preferable initiator, a radical polymerization initiator which is a compound that generates a radical upon light energy and/or heat energy and initiates or promotes a polymerization reaction of polymerizable compound is described in greater detail below, but the invention should not be construed as being limited thereto.

As the radical polymerization initiator preferably used in the invention, (a) an aromatic ketone, (b) an onium salt compound, (c) an organic peroxide, (d) a thio compound, (e) a hexaarylbiimidazole compound, (f) a ketoxime ester compound, (g) a borate compound, (h) an azinium compound, (i) a metallocene compound, (j) an active ester compound, (k) a compound having a carbon-halogen bond and (l) an azo series compound. Specific examples of the compounds of (a) to (l) are set forth below, but the invention should not be construed as being limited thereto.

(a) Aromatic Ketone

The aromatic ketone (a) preferably used as the radical polymerization initiator in the invention includes compounds having a benzophenone skeleton or a thioxantone skeleton described in J. P. Fouassier and J. F. Rabek, *Radiation Curing in Polymer Science and Technology*, pages 77 to 117 (1993). For example, the following compounds are recited.

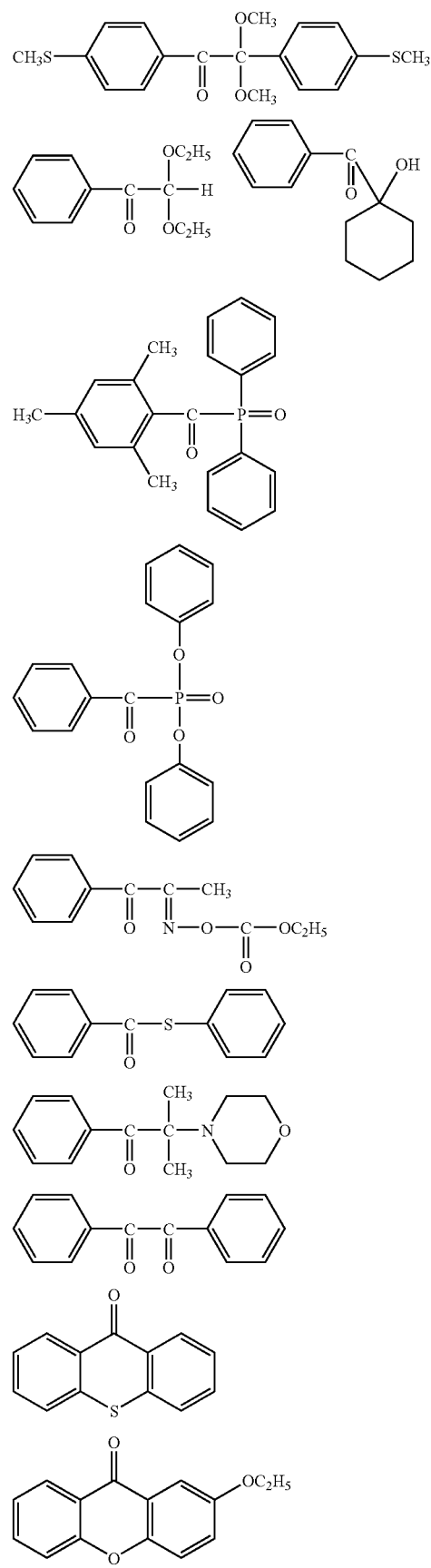

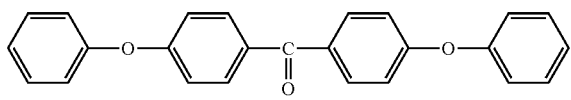

Among them, particularly preferable examples of the aromatic ketone (a) include the following compound:

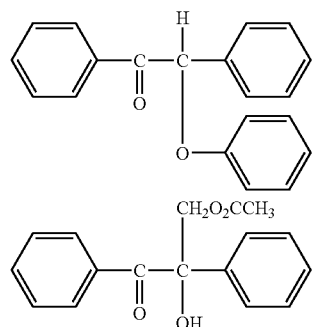

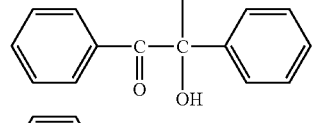

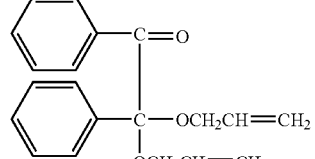

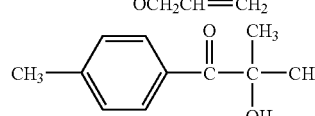

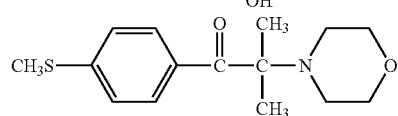

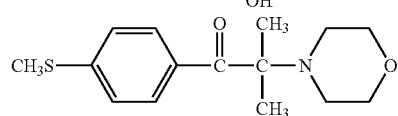

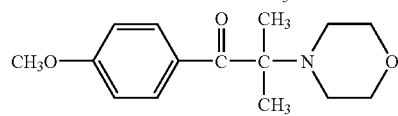

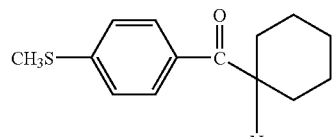

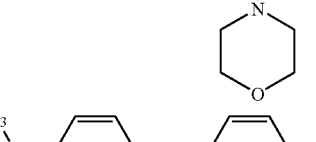

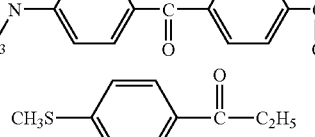

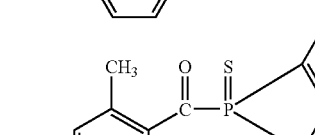

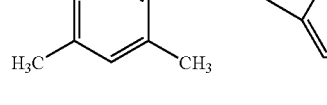

(b) Onium Salt Compound

The onium salt compound (b) preferably used as the radical polymerization initiator in the invention includes compounds represented by the following formulae (1) to (3):

$$Ar^1-I^+-Ar^2 \quad (Z^2)^- \qquad \text{Formula (1)}$$

$$Ar^3-N^+\equiv N \quad (Z^3)^- \qquad \text{Formula (2)}$$

$$\begin{matrix} R^{23} \\ \phantom{R}\diagdown \\ \phantom{RR}S^+-R^{25} \quad (Z^4)^- \\ \phantom{R}\diagup \\ R^{24} \end{matrix} \qquad \text{Formula (3)}$$

In formula (1), $Ar^1$ and $Ar^2$ each independently represent an aryl group having not more than 20 carbon atoms, which may have a substituent. $(Z^2)^-$ represents a counter ion selected from the group consisting of a halogen ion, a perchlorate ion, a carboxylate ion, tetrafluoroborate ion, a hexafluorophosphate ion and a sulfonate ion, and is preferably a perchlorate ion, a hexafluorophosphate ion and an arylsulfonate ion.

In formula (2), $Ar^3$ represents an aryl group having not more than 20 carbon atoms, which may have a substituent. $(Z^3)^-$ represents a counter ion having the same meaning as defined for $(Z^2)^-$.

In formula (3), $R^{23}$, $R^{24}$ and $R^{25}$, which may be the same or different, each represent a hydrocarbon group having not more than 20 carbon atoms, which may have a substituent. $(Z^4)^-$ represents a counter ion having the same meaning as defined for $(Z^2)^-$.

Specific examples of the onium salt preferably used in the invention include those described in Paragraph Nos. [0030] to [0033] of JP-A-2001-133969 and Paragraph Nos. [0015] to [0046] of JP-A-2001-343742, and specific aromatic sulfonium salt compounds described in JP-A-2002-148790, JP-A-2001-343742, JP-A-2002-6482, JP-A-2002-116539 and JP-A-2004-102031 both of which the applicant has been previously proposed.

(c) Organic Peroxide

The organic peroxide (c) preferably used as the radical polymerization initiator in the invention includes almost all organic compounds having at least one oxygen-oxygen bond in the molecules thereof. Specific examples of the organic peroxide include methyl ethyl ketone peroxide, cyclohexanone peroxide, 3,3,5-trimethylcyclohexanone peroxide, methylcyclohexanone peroxide, acetylacetone peroxide, 1,1-bis(tert-butylperoxy)-3,3,5-trimethylcyclohexane, 1,1-bis(tert-butylperoxy)cyclohexane, 2,2-bis(tert-butylperoxy)butane, tert-butylhydroperoxide, cumene hydroperoxide, diisopropylbenzene hydroperoxide, paramethane hydroperoxide, 2,5-dimethylhexane-2,5-dihydroperoxide, 1,1,3,3-tetramethylbutyl hydroperoxide, di-tert-butyl peroxide, tert-butyl cumyl peroxide, dicumyl peroxide, bis(tert-butylperoxyisopropyl)benzene, 2,5-dimethyl-2,5-di(tert-butylperoxy)hexane, 2,5-xanoyl peroxide, succinic peroxide, benzoyl peroxide, 2,4-dichlorobenzoyl peroxide, methatoluoyl peroxide, diisopropylperoxy dicarbonate, di-2-ethylhexylperoxy dicarbonate, di-2-ethoxyethylperoxy dicarbonate, dimethoxyisopropylperoxy dicarbonate, di(3-methyl-3-methoxybutyl)peroxy dicarbonate, tert-butylperoxy acetate, tert-butylperoxy pivalate, tert-butylperoxy neodecanoate, tert-butylperoxy octanoate, tert-butylperoxy 3,5,5-trimethylhexanoate, tert-butylperoxy laurate, tertiary carbonate, 3,3',4,4'-tetra(tert-butylperoxycarbonyl)benzophenone, 3,3',4,4'-tetra(tert-amylperoxycarbonyl)benzophenone, 3,3',4,4'-tetra(tert-hexylperoxycarbonyl)benzophenone, 3,3',4,4'-tetra(tert-octylperoxycarbonyl)benzophenone, 3,3',4,4'-tetra(cumylperoxycarbonyl)benzophenone, 3,3',4,4'-tetra(p-isopropylcumylperoxycarbonyl)benzophenone, carbonyl di(tert-butylperoxydihydrogen diphthalate) and carbonyl di(tert-hexylperoxydihydrogen diphthalate).

Among them, peroxy ester compounds, for example, 3,3',4,4'-tetra(tert-butylperoxycarbonyl)benzophenone, 3,3',4,4'-tetra(tert-amylperoxycarbonyl)benzophenone, 3,3',4,4'-tetra(tert-hexylperoxycarbonyl)benzophenone, 3,3',4,4'-tetra(tert-octylperoxycarbonyl)benzophenone, 3,3',4,4'-tetra(cumylperoxycarbonyl)benzophenone, 3,3',4,4'-tetra(p-isopropylcumylperoxycarbonyl)benzophenone and di-tert-butyldiperoxy isophthalate are preferred.

(d) Thio Compound

The thio compound (d) preferably used as the radical polymerization initiator in the invention includes compounds having the structure represented by the following formula (4):

Formula (4)

$$R^{26}-NH \atop R^{27}-C=S \quad \text{or} \quad R^{26}-N \atop R^{27}-C-SH$$

In formula (4), $R^{26}$ represents an alkyl group, an aryl group or a substituted aryl group. $R^{27}$ represents a hydrogen atom or an alkyl group. Alternatively, $R^{26}$ and $R^{27}$ combine with each other and together represent a non-metallic atomic group necessary for forming a 5-membered, 6-membered or 7-membered ring, which may contain a hetero atom selected from an oxygen atom, a sulfur atom and a nitrogen atom.

Specific examples of the thio compound represented by formula (4) include the following compounds:

| No. | $R^{26}$ | $R^{27}$ |
|---|---|---|
| 1 | —H | —H |
| 2 | —H | —CH$_3$ |
| 3 | —CH$_3$ | —H |
| 4 | —CH$_3$ | —CH$_3$ |

-continued

| No. | $R^{26}$ | $R^{27}$ |
|---|---|---|
| 5 | —C$_6$H$_5$ | —C$_2$H$_5$ |
| 6 | —C$_6$H$_5$ | —C$_4$H$_9$ |
| 7 | —C$_6$H$_4$Cl | —CH$_3$ |
| 8 | —C$_6$H$_4$Cl | —C$_4$H$_9$ |
| 9 | —C$_6$H$_4$—CH$_3$ | —C$_4$H$_9$ |
| 10 | —C$_6$H$_4$—OCH$_3$ | —CH$_3$ |
| 11 | —C$_6$H$_4$—OCH$_3$ | —C$_2$H$_5$ |
| 12 | —C$_6$H$_4$—OC$_2$H$_5$ | —CH$_3$ |
| 13 | —C$_6$H$_4$—OC$_2$H$_5$ | —C$_2$H$_5$ |
| 14 | —C$_6$H$_4$—OCH$_3$ | —C$_4$H$_9$ |
| 15 | —(CH$_2$)$_2$— | |
| 16 | —(CH$_2$)$_2$—S— | |
| 17 | —CH(CH$_3$)—CH$_2$—S— | |
| 18 | —CH$_2$—CH(CH$_3$)—S— | |
| 19 | —C(CH$_3$)$_2$—CH$_2$—S— | |
| 20 | —CH$_2$—C(CH$_3$)$_2$—S— | |
| 21 | —(CH$_2$)$_2$—O— | |
| 22 | —CH(CH$_3$)—CH$_2$—O— | |
| 23 | —C(CH$_3$)$_2$—CH$_2$—O— | |
| 24 | —CH=CH—N(CH$_3$)— | |
| 25 | —(CH$_2$)$_3$—S— | |
| 26 | —(CH$_2$)$_2$—CH(CH$_3$)—S— | |
| 27 | —(CH$_2$)$_3$—O— | |
| 28 | —(CH$_2$)$_5$— | |
| 29 | —C$_6$H$_4$—O— | |
| 30 | —N=C(SCH$_3$)—S— | |
| 31 | —C$_6$H$_4$—NH— | |
| 32 | 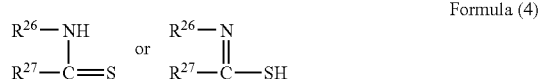 | |

(e) Hexaarylbiimidazole Compound

The hexaarylbiimidazole compound (e) preferably used as the radical polymerization initiator in the invention includes lophine dimers described in JP-B-45-37377 and JP-B-44-86516, specifically, for example, 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl)biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole and 2,2'-bis(o-trifluoromethylphenyl)-4,4',5,5'-tetraphenylbiimidazole.

(f) Ketoxime Ester Compound

The ketoxime ester compound (f) preferably used as the radical polymerization initiator in the invention includes, for example, 3-benzoyloxyiminobutan-2-one, 3-acetoxyiminobutan-2-one, 3-propyonyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one and 2-ethoxycarbonyloxyimino-1-phenylpropan-1-one.

(g) Borate Compound

The borate compound (g) preferably used as the radical polymerization initiator in the invention includes compounds represented by the following formula (5):

Formula (5)

$$R^{28}-\underset{\underset{R^{30}}{|}}{\overset{\overset{R^{29}}{|}}{B}}-R^{31} \quad (Z^5)^+$$

In formula (5), $R^{28}$, $R^{29}$, $R^{30}$ and $R^{31}$, which may be the same or different, each represents a substituted or unsubstituted alkyl group, a substituted or unsubstituted aryl group, a substituted or unsubstituted alkenyl group, a substituted or unsubstituted alkynyl group or a substituted or unsubstituted heterocyclic group, or at least two of $R^{28}$, $R^{29}$, $R^{30}$ and $R^{31}$ may be combined with each other to form a cyclic structure, provided that at least one of $R^{28}$, $R^{29}$, $R^{30}$ and $R^{31}$ represents a substituted or unsubstituted alkyl group. $(Z^5)^+$ represents an alkali metal cation or a quaternary ammonium cation.

Specific examples of the compound represented by formula (5) include compounds described in U.S. Pat. Nos. 3,567,453 and 4,343,891, European Patents 109,772 and 109,773, and the following compounds:

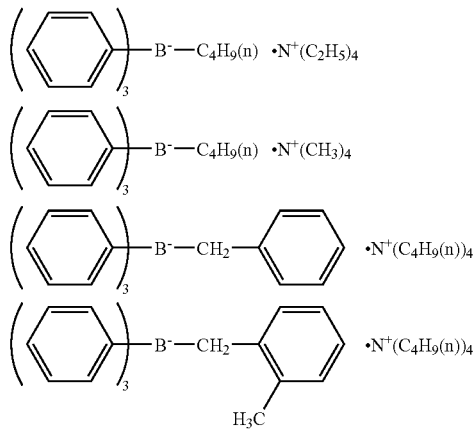

(h) Azinium Compound

The azinium compound (h) preferably used as the radical polymerization initiator in the invention includes compounds having an N—O bond described in JP-A-63-138345, JP-A-63-142345, JP-A-63-142346, JP-A-63-143537 and JP-B-46-42363.

(i) Metallocene Compound

The metallocene compound (i) preferably used as the radical polymerization initiator in the invention includes titanocene compounds described in JP-A-59-152396, JP-A-61-151197, JP-A-63-41484, JP-A-2-249 and JP-A-2-4705, and iron-arene complexes described in JP-A-1-304453 and JP-A-1-152109.

Specific examples of the titanocene compound include dicyclopentadienyl-Ti-dichloride, dicyclopentadienyl-Ti-biphenyl, dicyclopentadienyl-Ti-bis-2,3,4,5,6-pentafluorophen-1-yl, dicyclopentadienyl-Ti-bis-2,3,5,6-tetrafluorophen-1-yl, dicyclopentadienyl-Ti-bis-2,4,6-trifluorophen-1-yl, dicyclopentadienyl-Ti-bis-2,6-difluorophen-1-yl, dicyclopentadienyl-Ti-bis-2,4-difluorophen-1-yl, dimethylcyclopentadienyl-Ti-bis-2,3,4,5,6-pentafluorophen-1-yl, dimethylcyclopentadienyl-Ti-bis-2,3,5,6-tetrafluorophen-1-yl, dimethylcyclopentadienyl-Ti-bis-2,4-difluorophen-1-yl, bis(cyclopentadienyl)bis[2,6-difluoro-3-(pyr-1-yl)phenyl]titanium, bis(cyclopentadienyl)bis[2,6-difluoro-3-(methylsulfonamido)phenyl]titanium, bis(cyclopentadienyl)bis[2,6-difluoro-3-(N-butylpivaloylamino)phenyl]titanium, bis(cyclopentadienyl)bis[2,6-difluoro-3-(N-butyl-(4-chlorobenzoyl)amino)phenyl]titanium, bis(cyclopentadienyl)bis[2,6-difluoro-3-(N-benzyl-2,2-dimethylpentanoylamino)phenyl]titanium, bis(cyclopentadienyl)bis[2,6-difluoro-3-(N-(2-ethylhexyl)-4-tolylsulfonylamino)phenyl]titanium, bis(cyclopentadienyl)bis[2,6-difluoro-3-(N-(3-oxaheptyl)benzoylamino)phenyl]titanium, bis(cyclopentadienyl)bis[2,6-difluoro-3-(N-(3,6-dioxadecyl)benzoylamino)phenyl]titanium, bis(cyclopentadienyl)bis[2,6-difluoro-3-(trifluoromethylsulfonylamino)phenyl]titanium, bis(cyclopentadienyl)bis[2,6-difluoro-3-(trifluoroacetylamino)phenyl]titanium, bis(cyclopentadienyl)bis[2,6-difluoro-3-(2-chlorobenzoylamino)phenyl]titanium, bis(cyclopentadienyl)bis[2,6-difluoro-3-(4-chlorobenzoylamino)phenyl]titanium, bis(cyclopentadienyl)bis[2,6-difluoro-3-(N-(3,6-dioxadecyl)-2,2-dimethylpentanoylamino)phenyl]titanium, bis(cyclopentadienyl)bis[2,6-difluoro-3-(N-(3,7-dimethyl-7-methoxyoctyl)benzoylamino)phenyl]titanium and bis(cyclopentadienyl)bis[2,6-difluoro-3-(N-cyclohexylbenzoylamino)phenyl]titanium.

(j) Active Ester Compound

The active ester compound (j) preferably used as the radical polymerization initiator in the invention includes imidosulfonate compounds described in JP-B-62-6223, and active sulfonates described in JP-B-63-14340 and JP-A-59-174831.

(k) Compound having a Carbon-Halogen Bond

The compound having a carbon-halogen bond (k) preferably used as the radical polymerization initiator in the invention includes the compounds represented by the following formulae (6) to (12):

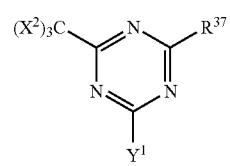

Formula (6)

In formula (6), $X^2$ represents a halogen atom, $Y^1$ represents $-C(X^2)_3$, $-NH_2$, $-NHR^{38}$, $-N(R^{38})_2$ or $-OR^{38}$, $R^{38}$ represents an alkyl group, a substituted alkyl group, an aryl group or a substituted aryl group, and $R^{37}$ represents $-C(X^2)_3$, an alkyl group, a substituted alkyl group, an aryl group, a substituted aryl group or a substituted alkenyl group.

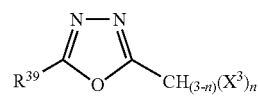

Formula (7)

In formula (7), $R^{39}$ represents an alkyl group, a substituted alkyl group, an alkenyl group, a substituted alkenyl group, an aryl group, a substituted aryl group, a halogen atom, an alkoxy group, a substituted alkoxy group, a nitro group or a cyano group, $X^3$ represents a halogen atom, and n represents an integer of 1 to 3.

Formula (8)

In formula (8), $R^{40}$ represents an aryl group or a substituted aryl group, $R^{41}$ represents a group shown below or a halogen atom, $Z^6$ represents $-C(=O)-$, $-C(=S)-$ or $-SO_2-$, $X^3$ represents a halogen atom, and m represents 1 or 2.

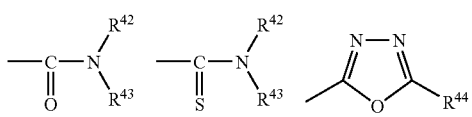

wherein $R^{42}$ and $R^{43}$ each represents an alkyl group, a substituted alkyl group, an alkenyl group, a substituted alkenyl group, an aryl group or a substituted aryl group, and $R^{44}$ has the same meaning as defined for $R^{38}$ in formula (6).

Formula (9)

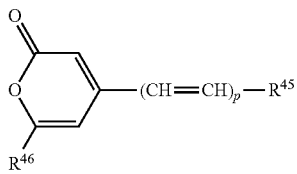

In formula (9), $R^{45}$ represents an aryl group which may be substituted or a heterocyclic group which may be substituted, $R^{46}$ represents a trihaloalkyl group or trihaloalkenyl group each having from 1 to 3 carbon atoms, and p represents 1, 2 or 3.

Formula (10)

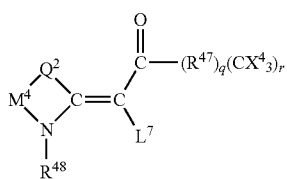

In formula (10), which represents a carbonylmethylene heterocyclic compound having a trihalogenomethyl group, $L^7$ represents a hydrogen atom or a group represented by formula $—CO—(R^{47})_q(C(X^4)_3)_r$, $Q^2$ represents a sulfur atom, a selenium atom, an oxygen atom, a dialkylmethylene group, an alken-1,2-ylene group, a 1,2-phenylene group or $—N(—R^{48})—$, $M^4$ represents a substituted or unsubstituted alkylene group, a substituted or unsubstituted alkenylene group or a 1,2-arylene group, $R^{48}$ represents an alkyl group, an aralkyl group or an alkoxyalkyl group, $R^{47}$ represents a divalent carbocyclic or heterocyclic aromatic group, $X^4$ represents a chlorine atom, a bromine atom or an iodine atom, q represents 0 or 1, and r represents 1 or 2, provided that when q represents 0, r represents 1, and when q represents 1, r represents 1 or 2.

Formula (11)

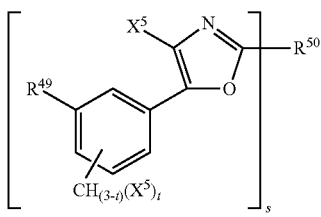

In formula (11), which represents a 4-halogeno-5-(halogenomethylphenyl)oxazole derivative, $X^5$ represents a halogen atom, t represents an integer of 1 to 3, s represents an integer of 1 to 4, $R^{49}$ represents a hydrogen atom or $—CH_{3-t}X^5_t$, and $R^{50}$ represents an s-valent unsaturated organic residue, which may be substituted.

Formula (12)

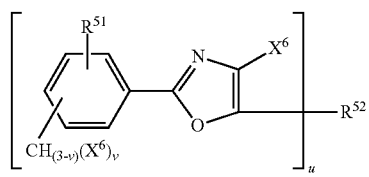

In formula (12), which represents a 2-(halogenomethylphenyl)-4-halogenooxazole derivative, $X^6$ represents a halogen atom, v represents an integer of 1 to 3, u represents an integer of 1 to 4, $R^{51}$ represents a hydrogen atom or $—CH_{3-v}X^6_v$, and $R^{52}$ represents an u-valent unsaturated organic residue, which may be substituted.

Specific examples of the compound having a carbon-halogen bond include compounds described in Wakabayashi et al., *Bull. Chem. Soc. Japan*, Vol. 42, 2924 (1969), for example, 2-phenyl-4,6-bis(trichloromethyl)-S-triazine, 2-(p-chlorophenyl)-4,6-bis(trichloromethyl)-S-triazine, 2-(p-tolyl)-4,6-bis(trichloromethyl)-S-triazine, 2-(p-methoxyphenyl)-4,6-bis(trichloromethyl)-S-triazine, 2-(2',4'-dichlorophenyl)-4,6-bis(trichloromethyl)-S-triazine, 2,4,6-tris(trichloromethyl)-S-triazine, 2-methyl-4,6-bis(trichloromethyl)-S-triazine, 2-n-nonyl-4,6-bis(trichloromethyl)-S-triazine and 2-(α,α,β-trichloroethyl)-4,6-bis(trichloromethyl)-S-tiazine. Further, compounds described in British Patent 1,388,492, for example, 2-styryl-4,6-bis(trichloromethyl)-S-triazine, 2-(p-methylstyryl)-4,6-bis(trichloromethyl)-S-triazine, 2-(p-methoxystyryl)-4,6-bis(trichloromethyl)-S-triazine and 2-(p-methoxylstyryl)-4-amino-6-trichloromethyl-S-triazine, compounds described in JP-A-53-133428, for example, 2-(4-methoxynaphth-1-yl)-4,6-bis(trichloromethyl)-S-triazine, 2-(4-ethoxynaphth-1-yl)-4,6-bis(trichloromethyl)-S-triazine, 2-[4-(2-ethoxyethyl)naphth-1-yl]-4,6-bis(trichloromethyl)-S-triazine, 2-(4,7-dimethoxynaphth-1-yl)-4,6-bis(trichloromethyl)-S-triazine and 2-(acenaphth-5-yl)-4,6-bis(trichloromethyl)-S-triazine, and compounds described in German Patent 3,337,024, for example, the compounds shown below are exemplified. Moreover, compounds which can be easily synthesized by one skilled in the art according to synthesis methods described in M. P. Hutt, E. F. Elslager and L. M. Herbel, *Journal of Heterocyclic Chemistry*, Vol. 7, No. 3, page 511 et seq. (1970), for example, the compounds shown below are exemplified.

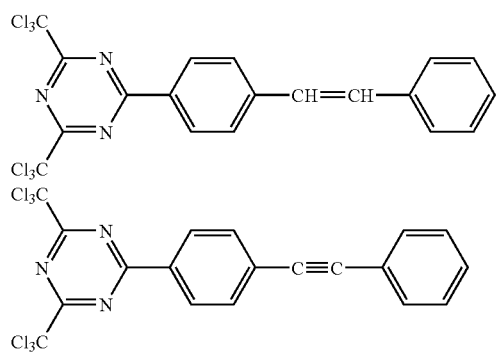

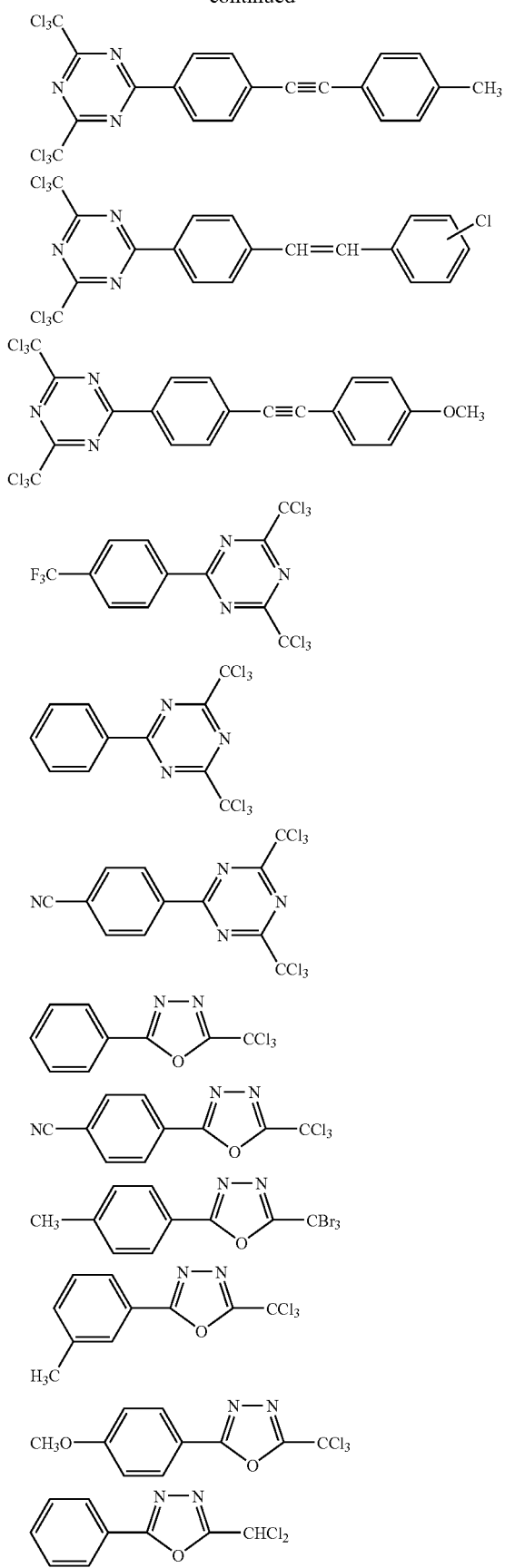

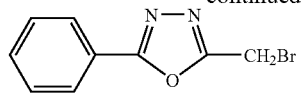

(l) Azo Series Compound

The azo series compound (l) preferably used as the radical polymerization initiator in the invention includes, for example, 2,2'-azobisisobutyronitrile, 2,2'-azobispropionitrile, 1,1'-azobis(cyclohexane-1-carbonitrile), 2,2'-azobis(2-methylbutyronitrile), 2,2'-azobis(2,4-dimethylvaleronitrile), 2,2'-azobis(4-methoxy-2,4-dimethylvaleronitrile), 4,4'-azobis(4-cyanovaleric acid), dimethyl 2,2'-azobisisobutyrate, 2,2'-azobis(2-methypropionamidooxime), 2,2'-azobis[2-(2-imidazolin-2-yl)propane], 2,2'-azobis {2-methyl-N-[1,1-bis(hydroxymethyl)-2-hydroxyethyl]propionamide}, 2,2'-azobis[2-methyl-N-(2-hydroxyethyl)propionamide], 2,2'-azobis(N-butyl-2-methylpropionamide), 2,2'-azobis(N-cyclohexyl-2-methylpropionamide), 2,2'-azobis[N-(2-propenyl)-2-methylpropionamide] and 2,2'-azobis(2,4,4-trimethylpentane).

More preferable examples of the radical polymerization initiator for use in the invention include the above-described aromatic ketone (a), onium salt compound (b), organic peroxide (c), hexaarylbiimidazole compound (e), metallocene compound (i) and compound having a carbon-halogen bond (k), and most preferable examples of the radical initiator include the aromatic iodonium salt, aromatic sulfonium salt, titanocene compound and trihalomethyl-S-triazine compound represented by formula (6) described above.

The polymerization initiator can be added to the resin composition for laser engraving containing a polymerizable compound preferably from 0.01 to 10% by weight, more preferably from 0.1 to 3% by weight, based on the total solid content of the resin composition.

The polymerization initiators can be preferably used individually or in combination of two or more thereof in the invention.

<(F) Plasticizer>

Examples of the plasticizer (F) include dioctyl phthalate, didodecyl phthalate, triethylene glycol dicaprylate, methyl glycol phthalate, tricresyl phosphate, dioctyl adipate, dibutyl sebacate and triacetyl glycerol. Also, a polyethylene glycol or a polypropylene glycol (monool type or diol type) is also used as the plasticizer.

The plasticizer has a function of making a relief-forming layer flexible and should have good compatibility with the binder polymer. In general, a compound having high hydrophilicity has good compatibility with the binder polymer. Of the compound having high hydrophilicity, a compound having a structure alternately comprising a hydrophilic group and a hydrophobic group, for example, an ether compound containing a hetero atom in a straight chain or a secondary amine is preferably used. This is because the existence of hydrophilic group, for example, —O— or —NH— expresses the compatibility with a PVA derivative and the hydrophobic group other than the hydrophilic group weakens the intermolecular force of PVA derivative to act for increase in the flexibility. Also, a compound having a small number of hydroxy groups capable of forming a hydrogen atom between the PVA derivative is preferably used. Examples of such compound include ethylene glycol, propylene glycol and a dimer, trimer, homomultimer or comultimer including tetramer or more thereof and a secondary amine, for example, diethanolamine or dimethylolamine. Among them, ethylene glycols (including monomer, dimer, trimer and multimer)

which have small steric hindrance, are excellent in compatibility and have lower toxicity are particularly preferably used as the plasticizer (F).

The ethylene glycols are roughly separated into three classes depending on the molecular weight thereof. The first class includes ethylene glycol which is a monomer. The second class includes diethylene glycol which is a dimer and triethylene glycol which is a trimer. The third class includes polyethylene glycol including a tetramer or more. The polyethylene glycols are often marketed under trade names indicating the average molecular weight thereof in the suffix position. The polyethylene glycols are broadly classified into liquid polyethylene glycols having a molecular weight of 200 to 700 and solid polyethylene glycols having a molecular weight of 1,000 or more.

As a result of the intensive investigations, it has been found that as the plasticizer has lower molecular weight, it has the larger effect of making the resin flexible. For this reason, particularly, ethylene glycol in the first class, diethylene glycol and triethylene glycol in the second group and tetraethylene glycol (tetramer) included in the third class are preferably used. Among them, diethylene glycol, triethylene glycol and tetraethylene glycol are more preferably used as the plasticizer (F) from the standpoint of lower toxicity and excellent handling property because of free from extraction from the resin composition. Mixtures of two or more thereof are also preferably used.

The plasticizer can be added in an amount of 10% by weight or less based on the total solid content of the resin composition for laser engraving.

<Additives for Assisting Heat Transfer>

When a substance having high thermal conductivity is added for the purpose of assisting heat transfer, the engraving sensitivity further increases. As an inorganic compound (metal particle), gold fine particle, silver fine particle and copper fine particle each having a particle diameter of micrometer order to several nanometer order are preferable. As an organic compound, a polymer ordinarily known as a conductive polymer is preferable.

In particular, of the conductive polymers, polyaniline, polythiophene, polyisothianaphthene, polypyrrole, polyethylenedioxythiophene, polyacetylene and derivatives thereof are preferable, and in view of high sensitivity, polyaniline, polythiophene, polyethylenedioxythiophene and derivatives thereof are more preferable, polyaniline is particularly preferable. The polyaniline may be added in any form of emeraldine base and emeraldine salt and is preferably added in the form of emeraldine salt in view of high heat transfer efficiency.

According to a preferred embodiment of the invention, a combination use of the polyester (A), for example, polylactic acid and the hydrophilic polymer, for example, PVA is exemplified as described above. In such a case, since a solvent for preparing the composition is water or an alcoholic solvent, it is preferred that the conductive polymer is added in the form of an aqueous dispersion or aqueous solution to improve compatibility between the polyester (A) and the hydrophilic polymer, for example, PVA, from the standpoint of achieving high film strength and increase in engraving sensitivity resulting from the improvement in heat transfer efficiency.

Specific examples of the metal particle and conductive polymer include those described in catalogs of reagent maker, for example, Aldrich Corp., Wako Pure Chemical Industries, Ltd. or Tokyo Chemical Industry Co., Ltd.

From the standpoint of the improvement in heat transfer efficiency, most preferable conductive polymers include aqu-qPASS-O1X (produced by Mitsubishi Rayon Co., Ltd.), Panipol-W (produced by Panipol Ltd.) and Panipol-F (produced by Panipol Ltd.).

<Additives for Increasing Engraving Sensitivity>

It is more preferable to add nitrocellulose to the resin composition as the additive for the purpose of increasing the engraving sensitivity. Since the nitrocellulose is a self-reactive compound, it generates heat and assists heat decomposition of the coexisting hydrophilic polymer at the time of laser engraving. As a result, it is believed that the engraving sensitivity increases.

The kind of nitrocellulose used is not particularly restricted as long as it is decomposable upon heat and may be any of RS (regular soluble) type, SS (spirit soluble) type and AS (alcohol soluble) type. The nitrogen content of nitrocellulose is ordinarily approximately from 10 to 14% by weight, preferably approximately from 11 to 12.5% by weight, more preferably approximately from 11.5 to 12.2% by weight. The polymerization degree of nitrocellulose can also be selected in a wide range, for example, of 10 to 1,500. The polymerization degree of nitrocellulose is preferably approximately from 10 to 900, particularly preferably approximately from 15 to 150. Preferable examples of the nitrocellulose include nitrocellulose having solution viscosity approximately from 20 to $1/10$ second, preferably approximately from 10 to $1/8$ second, as determined in accordance with JIS K6703 "Nitrocellulose for industry use" (the viscosity expression of Hercules Powder Co.). Nitrocellulose having the solution viscosity approximately from 5 to $1/8$ second, particularly approximately from 1 to $1/8$ second, is used in many cases. As the nitrocellulose used for forming the resin composition for laser engraving, nitrocellulose of RS type soluble in an ester, for example, ethyl acetate, a ketone, for example, methyl ethyl ketone or methyl isobutyl ketone or an ether, for example, cellosolve (for example, nitrocellulose having the nitrogen content approximately from 11.7 to 12.2) is used in many cases. Two or more kinds of nitrocellulose may be used in mixture, if desired.

The amount of nitrocellulose used may be selected in a range not decreasing the sensitivity of resin composition for laser engraving and it is ordinarily approximately from 5 to 300 parts by weight, preferably approximately from 20 to 250 parts by weight, more preferably approximately from 50 to 200 parts by weight, based on 100 parts by weight of the binder polymer and the polymerizable compound (C). The nitrocellulose is used in an amount approximately from 40 to 200 parts by weight in many cases.

<Co-Sensitizer>

The sensitivity at the photo-curing of the resin composition for laser engraving can be further improved by using a certain additive (hereinafter referred to as a "co-sensitizer"). The operation mechanism of the co-sensitizer is not quite clear but may be considered to be mostly based on the following chemical process. Specifically, the co-sensitizer reacts with various intermediate active species (for example, a radical or a cation) generated during the process of photo-reaction initiated by the photopolymerization initiator and subsequent addition-polymerization reaction to produce new active radicals. The co-sensitizers are roughly classified into (a) compound which is reduced to produce an active radical, (b) compound which is oxidized to produce an active radical and (c) compound which reacts with a radical having low activity to convert it into a more highly active radical or acts as a chain transfer agent. However, in many cases, a common view about which an individual compound belongs to which type is not present.

(a) Compound which is Reduced to Produce an Active Radical
Compound having Carbon-Halogen Bond:
An active radical is considered to be generated by the reductive cleavage of the carbon-halogen bond. Specific examples of the compound preferably used include a trihalomethyl-s-triazine and a trihalomethyloxadiazole.
Compound having Nitrogen-Nitrogen Bond:
An active radical is considered to be generated by the reductive cleavage of the nitrogen-nitrogen bond. Specific examples of the compound preferably used include a hexaarylbiimidazole.
Compound having Oxygen-Oxygen Bond:
An active radical is considered to be generated by the reductive cleavage of the oxygen-oxygen bond. Specific examples of the compound preferably used include an organic peroxide.
Onium Compound:
An active radical is considered to be generated by the reductive cleavage of a carbon-hetero bond or oxygen-nitrogen bond. Specific examples of the compound preferably used include a diaryliodonium salt, a triarylsulfonium salt and an N-alkoxypyridinium (azinium) salt.
Ferrocene and Iron-Arene Complexes:
An active radical can be reductively produced.
(b) Compound which is Oxidized to Produce an Active Radical
Alkylate Complex:
An active radical is considered to be produced by the oxidative cleavage of a carbon-hetero bond. Specific examples of the compound preferably used include a triaryl alkyl borate.
Alkylamine Compound:
An active radical is considered to be produced by the oxidative cleavage of a C—X bond on the carbon adjacent to nitrogen, wherein X is preferably a hydrogen atom, a carboxyl group, a trimethylsilyl group or a benzyl group. Specific examples of the compound include an ethanolamine, an N-phenylglycine and an N-trimethylsilylmethylaniline.
Sulfur-Containing or Tin-Containing Compound:
A compound in which the nitrogen atom of the above-described amine compound is replaced by a sulfur atom or a tin atom is considered to produce an active radical in the same manner. Also, a compound having an S—S bond is known to effect sensitization by the cleavage of the S—S bond.
α-Substituted Methylcarbonyl Compound:
An active radical can be generated by the oxidative cleavage of carbonyl-α-carbon bond. The compound in which the carbonyl is converted into an oxime ether also shows the similar function. Specific examples of the compound include an 2-alkyl-1-[4-(alkylthio)phenyl]-2-morpholinopronone-1 and an oxime ether obtained by a reaction of the 2-alkyl-1-[4-(alkylthio)phenyl]-2-morpholinopronone-1 with a hydroxyamine and subsequent etherification of the N—OH.
Sulfinic Acid Salt:
An active radical can be reductively produced. Specific examples of the compound include sodium arylsulfinate.
(c) Compound which Reacts with a Radical to Convert it into a more Highly Active Radical or Acts as a Chain Transfer Agent:
For example, a compound having SH, PH, SiH or GeH in its molecule is used as the compound. The compound donates hydrogen to a low active radical species to produce a radical or is oxidized and deprotonized to produce a radical. Specific examples of the compound include a 2-mercaptobenzothiazole, a 2-mercaptobenzoxazole and a 2-mercaptobenzimidazole.

A large number of examples of the co-sensitizer are more specifically described, for example, in JP-A-9-236913 as additives for the purpose of increasing sensitivity, and they can be used in the invention. Some of them are set forth below, but the invention should not be construed as being limited thereto. In the formulae below, -TMS indicates a trimethylsilyl group.

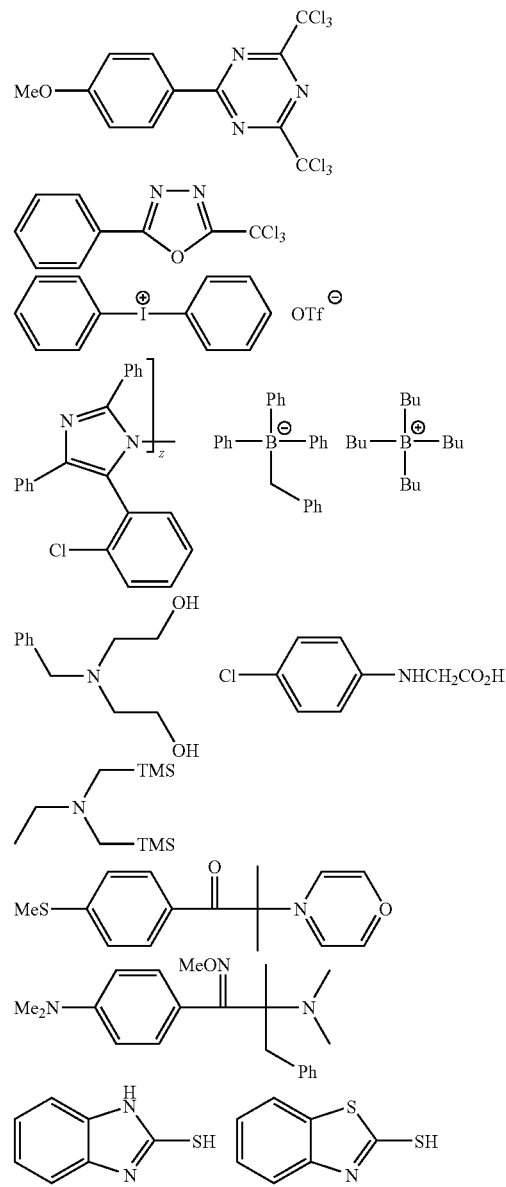

Similarly to the light-to-heat conversion agent (D) described above, the co-sensitizer can be subjected to various chemical modifications so as to improve the characteristics of the resin composition for laser engraving. For instance, methods, for example, binding to the light-to-heat conversion agent (D), polymerizable compound (C) or other part, introduction of a hydrophilic site, introduction of a substituent for improving compatibility or inhibiting deposition of crystal, introduction of a substituent for improving an adhesion property, and formation of a polymer, may be used.

The co-sensitizers may be used individually or in combination of two or more thereof. The amount of the co-sensitizer used is ordinarily from 0.05 to 100 parts by weight, preferably from 1 to 80 parts by weight, more preferably from 3 to 50 parts by weight, per 100 parts by weight of the polymerizable compound (C).

<Polymerization Inhibitor>

It is preferred to add a small amount of a thermal polymerization inhibitor to the resin composition according to the invention in addition to the above-described components, in order to prevent undesirable thermal polymerization of the polymerizable compound (C) during the production or preservation of the resin composition. Suitable examples of the thermal polymerization inhibitor include hydroquinone, p-methoxyphenol, di-tert-butyl-p-cresol, pyrogallol, tert-butylcatechol, benzoquinone, 4,4'-thiobis(3-methyl-6-tert-butylphenol), 2,2'-methylenebis(4-methyl-6-tert-butylphenol) and N-nitrosophenylhydroxyamine cerium(III) salt. Also, as the polymerization inhibitor, Q-1301 (10% tricresyl phosphate solution, produced by Wako Pure Chemical Industries, Ltd.) is preferably used because of extremely excellent stability at the preparation of resin printing plate precursor for laser engraving having a relief-forming layer using the resin composition according to the invention and the preservation thereof. When this compound is used in combination with the polymerizable compound (C) described above, the dramatically excellent preservation stability of the resin printing plate precursor for laser engraving and the good laser engraving sensitivity can be obtained. The amount of the thermal polymerization inhibitor added is preferably from about 0.01 to about 5% by weight based on the total amount of the resin composition for laser engraving. In order to avoid polymerization inhibition due to oxygen, a higher fatty acid derivative, for example, behenic acid or behenic amide may be added and allowed to localize on the resin composition layer surface during the drying step after the coating thereof on a support, if desired. The amount of the higher fatty acid derivative added is preferably from about 0.5 to about 10% by weight based on the total amount of the resin composition.

<Coloring Agent>

A coloring agent, for example, a dye or a pigment may further be added for the purpose of coloring the resin composition for laser engraving. By the coloring, properties, for example, visibility of the image area or aptitude for an image density measurement apparatus can be improved. A pigment is preferably used as the coloring agent. Specific examples the coloring agent include a pigment, for example, a phthalocyanine pigment, an azo pigment, carbon black or titanium oxide, and a dye, for example, Ethyl Violet, Crystal Violet, an azo dye, an anthraquinone dye or a cyanine dye. The amount of the coloring agent added is preferably from about 0.5 to about 5% by weight based on the total amount of the resin composition.

<Other Additive>

Further, a known additive, for example, a filler may be added for improving physical properties of the cured layer of the resin composition for laser engraving.

Examples of the filler include carbon black, carbon nanotube, fullerene, graphite, silica, alumina, aluminum and calcium carbonate. The fillers may be used individually or as a mixture.

[Resin Printing Plate Precursor for Laser Engraving]

The resin printing plate precursor for laser engraving according to the invention has on a support, a relief-forming layer comprising the resin composition for laser engraving according to the invention. When a crosslinkable resin composition is used as the resin composition for laser engraving, a crosslinkable relief-forming layer can be obtained. The resin printing plate precursor for laser engraving may further have an adhesive layer between the support and the relief-forming layer, and a slip coat layer and a protective film on the relief-forming layer, if desired.

In the resin printing plate precursor for laser engraving according to the invention, the relief-forming layer is crosslinked and then laser engraving is conducted to prepare a relief printing plate. By the crosslinkage of the relief-forming layer, abrasion of the relief-forming layer at the time of printing can be prevented and a relief printing plate having a sharp configuration after the laser engraving can be obtained.

The content of the binder polymer in the relief-forming layer is preferably from 30 to 80% by weight, more preferably from 40 to 70% by weight, based on the total solid content of the relief-forming layer. This is because when the content of the binder polymer is regulated to 30% by weight or more, it is possible to prevent cold flow of the printing plate precursor, whereas when the content of the binder polymer is regulated to 80% by weight or less, the printing durability sufficient for using as the relief printing plate is obtained without accompanying the lack of other components.

The content of the polymerization initiator (E) in the relief-forming layer is preferably from 0.01 to 10% by weight, more preferably from 0.1 to 3% by weight, based on the total solid content of the relief-forming layer. This is because when the content of the polymerization initiator (E) is regulated to 0.01% by weight or more, crosslinkage of the crosslinkable relief-forming layer is promptly performed, whereas when the content of the polymerization initiator (E) is regulated to 10% by weight or less, the printing durability sufficient for using as the relief printing plate is obtained without accompanying the lack of other components.

The content of the polymerizable compound (C) in the relief-forming layer is preferably from 10 to 60% by weight, more preferably from 15 to 40% by weight, based on the total solid content of the relief-forming layer. This is because when the content of the component (C) is regulated to 10% by weight or more, the printing durability sufficient for using as the relief printing plate is obtained, whereas when the content of the component (C) is regulated to 60% by weight or less, the strength sufficient for using as the relief printing plate is obtained.

The relief-forming layer is obtained by molding the resin composition in the shape of a sheet or a sleeve.

The material for use in the support of the resin printing plate precursor for laser engraving according to the invention is not particularly restricted and that having high dimensional stability is preferably used. Examples of the material include metal, for example, steel, stainless or aluminum, a plastic resin, for example, a polyester (e.g., PET, PBT or PAN) or polyvinyl chloride, a synthetic rubber, for example, styrene-butadiene rubber, and a plastic resin (for example, an epoxy resin or a phenol resin) enforced with glass fiber. As the support for the relief printing plate precursor, a PET (polyethylene terephthalate) film or a steel substrate is preferably used. The shape of the support is determined according to whether the relief-forming layer is a sheet form or a sleeve form.

Between the relief-forming layer and the support, an adhesive layer may be provided for the purpose of strengthening the adhesion property therebetween. The material for use in the adhesive layer may be a material which can strengthen the adhesion property after the crosslinkage of the relief-forming layer and it is preferable to have the strong adhesion property also before the crosslinkage of the relief-forming layer. The term "adhesion property" as used herein means both an adhesion property between the support and the adhesive layer and an adhesion property between the adhesive layer and the relief-forming layer.

With respect to the adhesion property between the support and the adhesive layer, the peel forth per one cm width of a sample is preferably 1.0 N/cm or more or unpeelable, more preferably 3.0 N/cm or more or unpeelable, when the adhesive layer and the relief-forming layer are peeled from a laminate of support/adhesive layer/relief-forming layer at a rate of 400 mm/sec.

With respect to the adhesion property between the adhesive layer and the relief-forming layer, the peel forth per one cm width of a sample is preferably 1.0 N/cm or more or unpeelable, more preferably 3.0 N/cm or more or unpeelable, when the adhesive layer is peeled from a laminate of adhesive layer/relief-forming layer.

The relief-forming layer constitutes a portion where a relief is formed after the laser engraving and the surface of the relief functions as an ink-receptive area. Since the relief-forming layer after the crosslinkage is strengthened by the crosslinkage, scratch or dent which adversely affects printing on the surface of the relief-forming layer hardly occurs. However, the relief-forming layer before the crosslinkage is insufficient in the strength in many cases and the scratch or dent is apt to be formed on the surface thereof. Thus, in order to prevent the occurrence of scratch or dent on the surface of the relief-forming layer, a protective film may be provided on the surface of the relief-forming layer.

When the protective film is too thin, the effect of preventing the occurrence of scratch or dent is not obtained and whereas, it is too thick, its handling is inconvenient and the cost increases. Therefore, the thickness of the protective film is preferably from 25 to 500 μm, more preferably from 50 to 200 μm.

As the protective film, a material known for a protective film for printing plate, for example, a polyester film, e.g., PET (polyethylene terephthalate) film or a polyolefin film, e.g., PE (polyethylene) film or PP (polypropylene) film can be used. The surface of the protective film may be plain or matted.

In the case of providing the protective film on the relief-forming layer, the protective film should be peelable. When the protective film is unpeelable or on the contrary when it is difficult to adhere on the relief-forming layer, a slip coat layer may be provided between the protective film and the relief-forming layer.

As the material for use in the slip coat layer, it is preferred that a resin which is soluble or dispersible in water and has low tackiness, for example, polyvinyl alcohol, polyvinyl acetate, partially saponified polyvinyl alcohol, hydroxyalkyl cellulose, alkyl cellulose or polyamide resin is mainly used. Of the resins, partially saponified polyvinyl alcohol having a saponification degree of 60 to 99% by mole, hydroxyalkyl cellulose including the alkyl group having from 1 to 5 carbon atoms and alkyl cellulose including the alkyl group having from 1 to 5 carbon atoms are particularly preferably used in view of the tackiness.

With respect to the peelability of the protective film, the peel forth per one cm width of a sample is preferably from 5 to 200 mN/cm, more preferably from 10 to 150 mN/cm, when the protective film is peeled from a laminate of relief-forming layer (and a slip coat layer)/protective film at a rate of 200 mm/sec. When the peel forth is 5 mN/cm or more, the protective film is prevented from peeling while at work and whereas, when the peel forth is 200 mN/cm or less, the protective film can be reasonably peeled.

Now, a method of producing the resin printing plate precursor for laser engraving is described below. The producing method is not particularly restricted and includes, for instance, a method wherein a solution of the resin composition for laser engraving is prepared, the solvent is removed from the solution and then the composition is subjected to melt extrusion on a support. Alternatively, a method wherein the solution of the resin composition for laser engraving is cast on a support and the solvent is removed from the solution by drying in an oven may be used.

Then, a protective film may be laminated on the relief-forming layer, if desired. The lamination can be performed by pressure bonding of the protective film to the relief-forming layer by means of a heated calendar roll or by bringing the protective film into close contact with the relief-forming layer impregnated with a small amount of a solvent in its surface.

In the case of using the protective film, a method wherein the relief-forming layer is firstly laminated on the protective film and then the support is laminated on the relief-forming layer may be adopted.

In the case of providing the adhesive layer, it can be responded by using a support having the adhesive layer coated thereon. In the case of providing the slip coat layer, it can be responded by using a protective film having the slip coat layer coated thereon.

The solution of the resin composition for laser engraving can be produced, for example, by dissolving the binder polymer and, if desired, a plasticizer in an appropriate solvent and then dissolving the polymerization initiator (E) and the polymerizable compound (C) in the resulting solution. Since most of the solvent component is necessary to be removed at the stage of the production of printing plate precursor, it is preferred to use an easily volatile solvent, for example, a low molecular alcohol (e.g., ethanol) and to control the total amount of the solvent added as small as possible. By increasing the temperature of the system, the amount of the solvent added can be reduced. However, since the polymerizable compound (C) is apt to undergo polymerization reaction when the temperature is too high, the preparation temperature of the solution after adding the polymerizable compound (C) and/or the polymerization initiator (E) is preferably from 30 to 80° C.

It is preferred that the relief-forming layer according to the invention has thickness of 0.05 mm or more before and after the crosslinkage, and it is more preferred that the relief-forming layer according to the invention has thickness of 0.05 mm or more after the crosslinkage. From the standpoint of satisfying various flexographic printing aptitudes, for example, abrasion resistance or ink transfer property, the thickness of the relief-forming layer on the printing plate (corresponding to the thickness of the relief-forming layer after the crosslinkage) is preferably from 0.05 to 10 mm, more preferably from 0.05 to 7 mm, particularly preferably from 0.05 to 0.3 mm.

[Relief Printing Plate and Production Thereof]

The resin printing plate precursor for laser engraving thus-obtained can produce a relief printing plate according to the sequential processes described below.

First example comprises (1a) a process of irradiating the resin printing plate precursor for laser engraving with an active ray to crosslink the relief-forming layer and (2) a process of laser engraving the crosslinked relief-forming layer.

Second example comprises (1b) a process of heating the resin printing plate precursor for laser engraving to crosslink the relief-forming layer and (2) a process of laser engraving the crosslinked relief-forming layer.

The processes (1a) and (1b) may be used together simultaneously or successively.

Further, the following processes may be included, if desired. Specifically, after the process (2), (3) a process of rinsing the engraved surface with water or a liquid mainly consisting of water, (4) a process of drying the engraved relief-forming layer and (5) a process of further crosslinking the relief-forming layer may be performed.

The process (1a) or (1b) is a process of crosslinking the relief-forming layer of the resin printing plate precursor for laser engraving. The relief-forming layer according to the invention preferably includes the binder polymer, the light-to-heat conversion agent (D), the polymerization initiator (E) and the polymerizable compound (C), and the process (1a) or (1b) is a process of polymerizing the polymerizable compound (C) by the action of the polymerization initiator (E) to form crosslinkage. The polymerization initiator (E) is a radical initiator and roughly classified into a photopolymerization initiator and a heat polymerization initiator depending on whether the trigger for generating a radical is light or heat.

In the case where the relief-forming layer contains a photopolymerization initiator, the relief-forming layer is irradiated with an active ray which is a trigger of the initiation of photopolymerization so that the relief-forming layer can be crosslinked. The irradiation of active ray is ordinarily performed on the all over surface of the relief-forming layer. As the active ray, visible light, an ultraviolet ray or an electron beam is exemplified and the ultraviolet ray is most ordinarily used. Assuming that a surface of the relief-forming layer facing to the support is a back surface, it is enough to irradiate only the surface of the relief-forming layer, but when the support is a transparent film which transmits the active ray, it is preferred to further irradiate the relief-forming layer with the active ray from the back surface. In the case where a protective film is present, the irradiation from the surface may be performed through the protective film or may be performed after removing the protective film. Since the polymerization inhibition may occur in the presence of oxygen, the irradiation of active ray may be performed after covering the crosslinkable relief-forming layer with a vinyl chloride sheet and vacuuming.

In the case where the relief-forming layer contains a heat polymerization initiator (the photopolymerization initiator described above may also be the heat polymerization initiator), the relief-forming layer can be crosslinked by heating the resin printing plate precursor for laser engraving. As the heating means, a method of heating the printing plate precursor in a hot air oven or a far-infrared oven for a prescribed time or a method of bringing the printing plate precursor into contact with a heated roll for a prescribed time is exemplified.

According to the process (1a) using light, since the printing plate precursor is not subjected to high temperature, there is little restriction on raw materials for the printing plate precursor, although an apparatus for irradiating the active ray is relatively expensive. Although the process (1b) using heat is advantageous in that the specific expensive apparatus is not needed, it is necessary to carefully select the raw materials used for the printing plate because the printing plate precursor is subjected to high temperature and there is a possibility that a thermoplastic polymer which becomes soft at high temperature is deformed during the heating.

In the case of the heat crosslinkage, a heat polymerization initiator may be added. In principle, as the polymerization initiator, a commercial heat polymerization initiator for free radical polymerization, for example, an appropriate peroxide, a hydroperoxide or a compound having an azo group is used. Representative vulcanizing agents are also used for the crosslinkage.

The heat crosslinkage is also performed by adding a heat-curable resin, for example, an epoxy resin as the crosslinking component to the layer.

As the crosslinking method of the relief-forming layer of the resin printing plate precursor for laser engraving, the crosslinkage by heating is more preferable according to the invention from the standpoint that the relief-forming layer can be cured (crosslinked) uniformly from the surface to the inside. According to the photo-crosslinkage, a problem in that the light is preferentially absorbed in the surface of the relief-forming layer so that the light can not sufficiently reach to the deep portion of the relief-forming layer may occur sometimes whereby the difficulty in that the degree of curing (crosslinkage) is uneven between the surface and inside of the relief-forming layer may arise (in case of the heat crosslinkage, a sufficient amount of heat is uniformly applied from the surface to the inside of the relief-forming layer).

By crosslinking the relief-forming layer, advantages are obtained firstly in that the relief formed after the laser engraving becomes sharp and secondly in that tackiness of engraved scrap occurred at the laser engraving is restrained. When a non-crosslinked relief-forming layer is engraved with laser, due to residual heat transmitted around the laser irradiation area a portion which is essentially not intended to be engraved is apt to melt or deform so that a sharp relief can not be obtained in some cases. Also, as a general property of material, as decreasing a molecular weight of the material, it tends to change from a solid to a liquid form, specifically, to increase tackiness. The engraved scrap occurred at the laser engraving of the relief-forming layer has a tendency toward increase in the tackiness as increasing the amount of materials having a low molecular weight used. Since the polymerizable compound (C) having a low molecular weight becomes a high molecular compound by the crosslinkage, the engraved scrap occurred tends to decrease the tackiness.

It is preferred that a shore A hardness of the relief-forming layer after the crosslinkage is from 50 to 90°. By using the relief-forming layer having the shore A hardness of 50° or more, the minute halftone dots formed by the engraving are not collapsed even when a strong printing pressure of a letterpress is applied to them so that normal printing can be performed. By using the relief-forming layer having the shore A hardness of 90° or less, the occurrence of thin spots in the solid image area can be prevented even in a flexographic printing in which a kiss touch printing pressure is used.

The process of laser engraving the crosslinked relief-forming layer (2) is a process in which the relief-forming layer is irradiated with a laser beam corresponding to the image to be formed to form a relief image. The process is preferably performed by controlling a laser head based on digital data of the image to be formed using a computer and irradiating the relief-forming layer with scanning. When an infrared laser is irradiated, molecular vibration of the molecule in the relief-forming layer occurs to generate heat. When a high output laser, for example, a carbon dioxide gas laser or a YAG laser is used as the infrared laser, a large amount of heat is generated at the laser irradiated area and the molecule in the relief-forming layer undergoes molecular scission or is ionized to be selectively removed, that is, to perform engraving. The advantage of the laser engraving is that the structure can be three-dimensionally controlled because the depth of engraving can be appropriately set. For instance, in the area where minute halftone dots are printed, the halftone dots are shallowly engraved or engraved to form shoulders so that collapse of the relief due to the printing pressure can be prevented. The channel for printing a fine outline character is deeply engraved so that printing ink can hardly fill the channel and collapse of the fine outline character can be prevented.

In particular, when the engraving is performed using an infrared laser corresponding to the maximum absorption wavelength of the light-to-heat conversion agent (D), a sharper relief image is obtained at higher sensitivity.

When the engraved scrap is attached on the engraved surface, the process of rinsing the engraved surface with water or a liquid mainly consisting of water (3) to wash away the engraved scrap may be introduced. As the rising means, for example, a method of spraying high-pressure water or a method of rubbing the engraved surface with a brush in the presence of water as the main component using a batch type or transporting type brush washing out machine known as a developing machine for a photosensitive resin anastatic printing plate is exemplified. When the tackiness due to the engraved scrap is not removed, a rinsing solution including soap may be used.

When the process of rinsing the engraved surface (3) is conducted, it is preferred to introduce the process of drying the engraved relief-forming layer (4) to volatilize the rinsing solution.

Further, if desired, the process of further crosslinking the relief-forming layer (5) may be performed. By performing the additional crosslinking process (5), the relief formed by the engraving is more strengthened.

The relief printing plate produced according the method of the invention allows printing by a letterpress with oil-based ion or UV ink and also allows printing by a flexographic printing machine with UV ink.

EXAMPLES

The present invention will be described in more detail with reference to the following examples, but the invention should not be construed as being limited thereto.

Example 1

In a three-necked flask equipped with a stirring blade and a condenser were put 50 g of poly(DL-lactide) (produced by Aldrich Corp.) as the polyester (A), 0.75 g of D99-009 (phthalocyanine compound, produced by Yamamoto Chemicals Inc.) as the light-to-heat conversion agent (D), 20 g of diethylene glycol as the plasticizer (F) and 50 g of n-butanone as the solvent and the mixture was heated at 65° C. for 120 minutes with stirring to dissolve the polymer. To the solution were further added 28 g of DPHA (dipentaerythritol hexaacrylate, produced by Toagosei Co., Ltd.) which was an ethylenically unsaturated monomer as the polymerizable compound (C) and 1.6 g of Irgacure 184 (α-hydroxyketone, produced by Ciba-Geigy Corp.) as the polymerization initiator (E) and the mixture was stirred for 30 minutes to obtain a fluent solution of crosslinkable resin composition for laser engraving for use in a crosslinkable relief-forming layer.

A spacer (frame) having a prescribed thickness was put on a PET substrate, the solution of resin composition for laser engraving was softly cast in the spacer (frame) not to overflow and dried in an oven of 70° C. for 3 hours to form a relief-forming layer having a thickness of about 1 mm, whereby a resin printing plate precursor for laser engraving was prepared.

Then, the relief-forming layer of the resin printing plate precursor was heated at 100° C. for 2.5 hours to perform heat crosslinkage of the relief-forming layer.

FD-100 equipped with a semiconductor laser having the maximum output of 16 W (laser emission wavelength of 840 nm) (produced by Tosei Electrobeam Co., Ltd.) was used as an infrared laser engraving apparatus. Under the engraving conditions of laser output of 15 W, scan rate of 100 mm/sec and pitch distance of 0.15 mm, a solid image area of 2 centimeters square was engraved to prepare a relief printing plate.

The depth of engraving was determined by observing the cross-section of the solid image area by Ultra-deep Color 3D Profile Measuring Microscope VK9510 (produced by Keyence Corp.) and measuring a difference of height between the surface of relief-forming layer and the engraved portion. The results obtained are shown in Table 1 together with the results of evaluations described below.

Examples 2 to 4

The same procedures were performed as in Example 1 except for changing the poly(DL-lactide) to poly(3-hydroxybutyrare) for Example 2, poly(ε-caprolactone) for Example 3 and poly(butylenesuccinate) for Example 4, respectively.

The number average molecular weight of the poly(DL-lactide), poly(3-hydroxybutyrare), poly(ε-caprolactone) and poly(butylenesuccinate) used in Examples 1 to 4 was 90,000, 30,000, 20,000 and 60,000 respectively.

Example 5

In a three-necked flask equipped with a stirring blade and a condenser were put 10 g of Landy PL-2000 (polylactic acid, produced by Miyoshi Oil and Fat Co., Ltd.) as the polyester (A), 40 g of Gosenal T-215 (PVA derivative, produced by Nippon Synthetic Chemical Industry Co., Ltd.) as the binder (B), 0.75 g of Ketjenblack EC600JD (carbon black, produced by Lion Corp.) as the light-to-heat conversion agent (D), 20 g of diethylene glycol as the plasticizer (F) and 35 g of water and 12 g of ethanol as the solvents and the mixture was heated at 70° C. for 120 minutes with stirring to dissolve the polymer. To the solution were further added 28 g of DPHA (dipentaerythritol hexaacrylate, produced by Toagosei Co., Ltd.) which was an ethylenically unsaturated monomer as the polymerizable compound (C) and 1.6 g of Irgacure 184 (α-hydroxyketone, produced by Ciba-Geigy Corp.) as the polymerization initiator (E) and the mixture was stirred for 30 minutes to obtain a fluent solution of crosslinkable resin composition for laser engraving for use in a crosslinkable relief-forming layer.

The same procedures was performed as in Example 1 except for using the abode-described solution of crosslinkable resin composition for laser engraving in place of the solution of crosslinkable resin composition for laser engraving of Example 1.

Example 6

The same procedures were performed as in Example 5 except for changing the DPHA to the compound shown below.

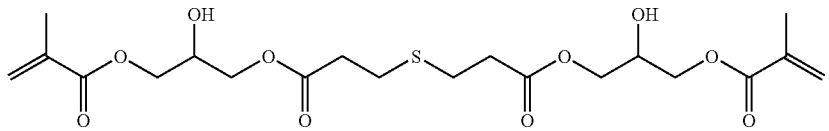 [SMILES: C=C(C)C(=O)OCC(O)COC(=O)CCSCCC(=O)OCC(O)COC(=O)C(=C)C]

Example 7

The same procedures were performed as in Example 6 except for changing the carbon black to equivalent amount of ADS820HO (cyanine compound, produced by American Dye Source, Inc.).

Example 8

The same procedures were performed as in Example 6 except for changing the carbon black to equivalent amount of D99-009 (phthalocyanine compound, produced by Yamamoto Chemicals Inc.).

Example 9

The same procedures were performed as in Example 6 except for further added 5 g of aquaPASS-01X (conductive polyaniline, produced by Mitsubishi Rayon Co., Ltd.).

Example 10

The same procedures were performed as in Example 6 except for further added 5 g of Panipol-W ((conductive polyaniline, produced by Panipol Ltd.).

The shore A hardness (23° C.) of the relief-forming layer after the heat crosslinkage in Examples 1, 2, 3, 4, 5, 6, 7, 8, 9 and 10 was 75°, 60°, 70°, 80°, 77°, 70°, 68°, 69°, 81° and 73°, respectively.

Examples 11 to 20

The same procedures were performed as in Examples 1 to 10 except for changing the laser for engraving from the semiconductor laser to a $CO_2$ laser described below, respectively.

$CO_2$ Laser Marker ML-Z9500 equipped with a carbon dioxide gas laser having the maximum output of 30 W (produced by Keyence Corp.) was used as a carbon dioxide gas laser engraving apparatus. Under the engraving conditions of laser output of 15 W, scan rate of 100 mm/sec and pitch distance of 0.15 mm, a solid image area of 2 centimeters square was engraved to prepare a relief printing plate.

Comparative Example 1

The same procedures were performed as in Example 6 except that the Landy PL-2000 was eliminated and the PVA derivative was compensated therefor.

Comparative Example 2

The same procedures were performed as in Example 6 except for changing the total amount of Landy PL-2000 and the PVA derivative to equivalent amount of TR-2000 (styrene-butadiene rubber, produced by JSR Corp.).

Comparative Examples 3 to 4

The same procedures were performed as in Comparative Examples 1 to 2 except for changing the laser for engraving from the semiconductor laser to the $CO_2$ laser described above, respectively.

|  | Laser Engraving | Depth of Engraving (μm) |
| --- | --- | --- |
| Example 1 | Semiconductor Laser | 560 |
| Example 2 | " | 510 |
| Example 3 | " | 520 |
| Example 4 | " | 520 |
| Example 5 | " | 520 |
| Example 6 | " | 600 |
| Example 7 | " | 600 |
| Example 8 | " | 600 |
| Example 9 | " | 650 |
| Example 10 | " | 650 |
| Example 11 | $CO_2$ Laser | 365 |
| Example 12 | " | 330 |
| Example 13 | " | 330 |
| Example 14 | " | 330 |
| Example 15 | " | 330 |
| Example 16 | " | 390 |
| Example 17 | " | 390 |
| Example 18 | " | 390 |
| Example 19 | " | 420 |
| Example 20 | " | 420 |
| Comparative Example 1 | Semiconductor Laser | 460 |
| Comparative Example 2 | " | 400 |
| Comparative Example 3 | $CO_2$ Laser | 280 |
| Comparative Example 4 | " | 250 |

From the result shown in Table 1, it can be confirmed that by the addition of the polyester (A), the depth of engraving is larger and the engraving sensitivity is higher in comparison with the case wherein the polyester (A) is not added.

What is claimed is:

1. A resin printing plate precursor for laser engraving comprising a relief-forming layer comprising a resin composition for laser engraving comprising a binder polymer comprising at least one polyester (A) selected from the group consisting of a polyhydroxyalkanoate, a lactic acid polymer, polyglycolic acid, and derivatives thereof, and mixtures thereof;
wherein the binder polymer further comprises (B) a hydrophilic polymer which is a polyvinyl alcohol derivative, and the resin composition further comprises (C) a polymerizable compound, and (D) a light-to-heat conversion agent selected from the group consisting of carbon black, a cyanine compound and a phthalocyanine compound and which is capable of absorbing light having a wavelength of from 700 to 1,300 nm.

2. A method for production of a relief printing plate comprising:

(1) a process of crosslinking the relief-forming layer as claimed in claim 1 with at least one of light and heat; and
(2) a process of laser engraving the crosslinked relief-forming layer.

3. The method for production of a relief printing plate as claimed in claim 2, wherein the process (1) is a process of crosslinking the relief-forming layer with heat.

4. The resin printing plate precursor for laser engraving as claimed in claim 1, wherein the polymerizable compound contains a sulfur atom.

* * * * *